US012644482B2

(12) United States Patent
Finlay et al.

(10) Patent No.: US 12,644,482 B2
(45) Date of Patent: Jun. 2, 2026

(54) FASTENER ASSEMBLY SENSOR UNIT

(71) Applicant: SALUNDA LIMITED, Oxfordshire (GB)

(72) Inventors: Alan Patrick John Finlay, Worcester (GB); Philip Samuel Pickles, Oxfordshire (GB); John Mark Newton, Oxfordshire (GB)

(73) Assignee: SALUNDA LIMITED, Bicester (GB)

( * ) Notice: Subject to any disclaimer, the term of this patent is extended or adjusted under 35 U.S.C. 154(b) by 413 days.

(21) Appl. No.: 17/598,031

(22) PCT Filed: Mar. 19, 2020

(86) PCT No.: PCT/GB2020/050737
§ 371 (c)(1),
(2) Date: Sep. 24, 2021

(87) PCT Pub. No.: WO2020/193956
PCT Pub. Date: Oct. 1, 2020

(65) Prior Publication Data
US 2022/0178399 A1 Jun. 9, 2022

(30) Foreign Application Priority Data

Mar. 26, 2019 (GB) ..................................... 1904172
May 3, 2019 (GB) ..................................... 1906318
(Continued)

(51) Int. Cl.
*F16B 31/04* (2006.01)
*G01D 11/30* (2006.01)
(Continued)

(52) U.S. Cl.
CPC .............. *F16B 31/04* (2013.01); *G01D 11/30* (2013.01); *G01D 21/02* (2013.01);
(Continued)

(58) Field of Classification Search
CPC ... F16B 31/04; F16B 2031/022; G01D 11/30; G01D 21/02; G01N 27/9006; G01L 5/24
See application file for complete search history.

(56) References Cited

U.S. PATENT DOCUMENTS 3,718,066 A 2/1973 Dally
4,342,909 A * 8/1982 Accattino ............ G01D 5/3473
250/237 G
(Continued)

FOREIGN PATENT DOCUMENTS

CA 2890971 A1 11/2016
CN 108001112 B 3/2024
(Continued)

OTHER PUBLICATIONS

Richard Fitzpatrick, Eddy Current (Year: 2007).*
(Continued)

*Primary Examiner* — Catherine T. Rastovski
*Assistant Examiner* — Sharad Timilsina
(74) *Attorney, Agent, or Firm* — MARSHALL, GERSTEIN & BORUN LLP; Michael P. Furmanek

(57) ABSTRACT

There is provided a sensor unit for a fastener assembly, the sensor unit comprising a mounting arranged to rigidly attach the sensor unit to, or adjacent to, a fastener assembly; and a sensor, that is an optical flow sensor or an inductive sensor, configured to sense movement of the fastener assembly. The sensor unit may comprise a processor arranged to process the output of the sensor to detect loosening of the fastener assembly and to output a signal representing the status of the fastener assembly. The sensor unit may comprise a wireless communication unit arranged to communicate the signal.

14 Claims, 21 Drawing Sheets

(30) Foreign Application Priority Data

| | | |
|---|---|---|
| May 26, 2019 | (GB) | ..................................... 1907447 |
| Jun. 13, 2019 | (GB) | ..................................... 1908506 |
| Aug. 5, 2019 | (GB) | ..................................... 1911161 |
| Aug. 28, 2019 | (GB) | ..................................... 1912349 |

(51) Int. Cl.

| | |
|---|---|
| *G01D 21/02* | (2006.01) |
| *G01L 5/24* | (2006.01) |
| *G01N 27/90* | (2021.01) |
| *F16B 31/02* | (2006.01) |

(52) U.S. Cl.

CPC .... *G01N 27/9006* (2013.01); *F16B 2031/022* (2013.01); *G01L 5/24* (2013.01)

(56) References Cited

U.S. PATENT DOCUMENTS

| | | | |
|---|---|---|---|
| 5,499,540 A | 3/1996 | Whaley et al. | |
| 5,970,798 A | 10/1999 | Gleman et al. | |
| 6,204,771 B1 | 3/2001 | Ceney | |
| 7,156,595 B2 | 1/2007 | Clarke | |
| 7,441,462 B2 | 10/2008 | Kibblewhite | |
| 7,467,556 B2 | 12/2008 | Kibblewhite et al. | |
| 7,644,627 B2 | 1/2010 | Kibblewhite et al. | |
| 7,650,792 B2 | 1/2010 | Kibblewhite | |
| 7,698,949 B2 | 4/2010 | Akdeniz et al. | |
| 7,946,179 B2 | 5/2011 | Kibblewhite et al. | |
| 8,028,585 B2 | 10/2011 | Kibblewhite | |
| 8,033,181 B2 | 10/2011 | Kibblewhite et al. | |
| 8,037,772 B2 | 10/2011 | Kibblewhite et al. | |
| 8,427,329 B2 | 4/2013 | Lev et al. | |
| 8,448,520 B1 | 5/2013 | Baroudi et al. | |
| 8,591,157 B1 | 11/2013 | Stewart et al. | |
| 8,683,869 B2 | 4/2014 | Herley et al. | |
| 8,810,370 B2 | 8/2014 | Tillotson et al. | |
| 8,950,990 B2 | 2/2015 | Dooner | |
| 8,978,697 B2 | 3/2015 | Hoppe et al. | |
| 9,030,212 B2 | 5/2015 | Karenowska et al. | |
| 9,085,196 B2 | 7/2015 | Dooner | |
| 9,127,998 B1 | 9/2015 | Guldiken et al. | |
| 9,157,818 B2 | 10/2015 | Schultz et al. | |
| 9,483,674 B1 | 11/2016 | Fink et al. | |
| 9,524,634 B2 | 12/2016 | Tillotson et al. | |
| 9,587,657 B2 | 3/2017 | Harrison et al. | |
| 9,677,593 B2 | 6/2017 | Hsieh | |
| 9,810,525 B2 | 11/2017 | Hashimoto et al. | |
| 9,964,134 B1 | 5/2018 | Tran et al. | |
| 10,165,340 B2 | 12/2018 | Tillotson et al. | |
| 2012/0268622 A1 | 10/2012 | Hildreth | |
| 2013/0068031 A1 | 3/2013 | Mekid et al. | |
| 2015/0337884 A1 | 11/2015 | Ceney | |

| | | | | |
|---|---|---|---|---|
| 2018/0165804 A1* | 6/2018 | Sakakibara | ........ | G01B 9/02017 |
| 2019/0009746 A1* | 1/2019 | Davis | .................. | B60R 25/1004 |
| 2021/0027475 A1* | 1/2021 | Kong | ......................... | G06T 7/11 |
| 2021/0104033 A1* | 4/2021 | Imagawa | .................. | G06T 7/74 |

FOREIGN PATENT DOCUMENTS

| | | | | | |
|---|---|---|---|---|---|
| DE | 102007015927 A1 | | 10/2008 | | |
| DE | 102008002609 A1 | | 12/2009 | | |
| DE | 102016215202 | * | 2/2018 | | |
| DE | 102016215202 A1 | * | 2/2018 | ............. | F16B 37/14 |
| EP | 1579862 A1 | | 9/2005 | | |
| EP | 2035217 A2 | | 3/2009 | | |
| EP | 2175147 A1 | | 4/2010 | | |
| EP | 2338032 A2 | | 6/2011 | | |
| EP | 2524061 A1 | | 11/2012 | | |
| EP | 2526702 A1 | | 11/2012 | | |
| EP | 2574735 A1 | | 4/2013 | | |
| EP | 2713137 A1 | | 4/2014 | | |
| GB | 2495388 A | | 4/2013 | | |
| GB | 2506424 A | | 4/2014 | | |
| GB | 2506912 A | | 4/2014 | | |
| JP | H08278116 A | * | 10/1996 | | |
| SG | 10201501801X | | 10/2015 | | |
| WO | WO-1998028548 A1 | | 7/1998 | | |
| WO | WO-98/41950 A1 | | 9/1998 | | |
| WO | WO-2000019179 A1 | | 4/2000 | | |
| WO | WO-2006062524 A2 | | 6/2006 | | |
| WO | WO-2007139834 A2 | | 12/2007 | | |
| WO | WO-2011085863 A1 | | 7/2011 | | |
| WO | WO-2011090539 A1 | | 7/2011 | | |
| WO | WO-2013169639 A1 | | 11/2013 | | |
| WO | WO-2017108051 A1 | | 6/2017 | | |
| WO | WO-2017203220 A1 | | 11/2017 | | |
| WO | WO-2018007804 A1 | | 1/2018 | | |
| WO | WO-2018093273 A1 | | 5/2018 | | |
| WO | WO-2018134107 A1 | | 7/2018 | | |
| WO | WO-2018134109 A1 | | 7/2018 | | |
| WO | WO-2019020972 A1 | | 1/2019 | | |
| WO | WO-2019102222 A1 | | 5/2019 | | |
| WO | WO-2019156712 A1 | | 8/2019 | | |

OTHER PUBLICATIONS

DE_102016215202_A (Year: 2018).*

JPH08278116A (Year: 1996).*

International Search Report and Written Opinion, issued in Applictation No. PCT/GB2020/050737, dated Jun. 4, 2020.

Written Opinion for Singapore Application No. 11202110424S dated Jul. 14, 2023.

International Search Report and Written Opinion, issued to International Application No. PCT/GB2021/052483, mailing date Dec. 8, 2021.

* cited by examiner

Fig. 17(a)
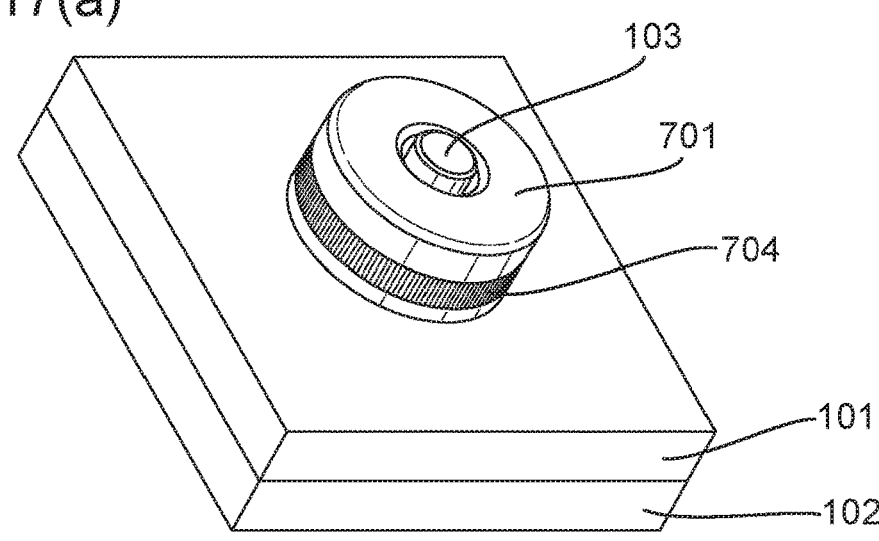
Fig. 17(b)
Fig. 17(c)
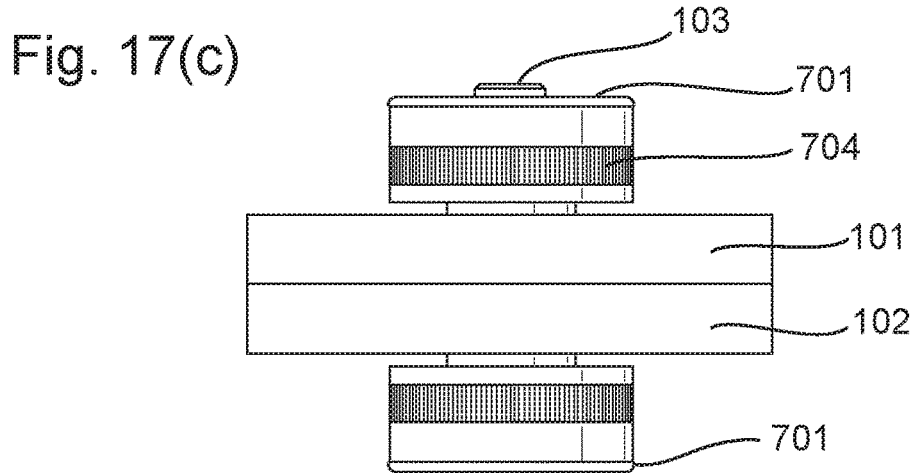

FASTENER ASSEMBLY SENSOR UNIT

CROSS-REFERENCE TO RELATED APPLICATIONS

This is the United States National Phase of International Patent Application No. PCT/GB2020/050737, filed Mar. 19, 2020, which claims priority to all of the following: (1) GB 1912349.6, filed Aug. 28, 2019, (2) GB 1911161.6, filed Aug. 5, 2019, (3) GB 1908506.7, filed Jun. 13, 2019, (4) GB 1907447.5, filed May 26, 2019, (5) GB 1906318.9 filed May 3, 2019, and (6) GB 1904172.2, filed Mar. 26, 2019. The entire contents of each of the forgoing applications are hereby expressly incorporated herein by reference.

FIELD OF THE DISCLOSURE

The present invention relates to a sensor unit for monitoring movement of fastener assemblies, particularly fastener assemblies in safety-critical or inaccessible applications.

BACKGROUND

Fasteners and bolts are used to securely join structures or wheels, for example beams and joists, disks, bearings, valves, flanges and plates, used in industry, for example to assemble and retain the superstructure or crane on a ship, or a drilling derrick on an oil or gas rig. Likewise, bolts may be critical to the integrity of a valve, flanges, seal, pipe fitting or blowout preventer. An array of fasteners is provided throughout a structure to securely join rigid members such as beams, cranks, wheels or plates. Bolts, rivets or fasteners are used to secure joints between the sections of rail, beams or joists. The bolts are provided with nuts or fasteners as part of assemblies mounted to the structures. An assembly typically comprises: a bolt head, a thread, washers and a nut rotatably supported on the thread of the bolt. Nuts close to retain bolts joining structures.

Bolts and fasteners are routinely inspected to ensure the rigidity and mechanical integrity of structures. Bolts and fasteners deteriorate in a variety of ways. For example, vibration may cause bolts to loosen and environmental exposure causes corrosion and disintegration of fasteners. Stress may cause bolts to fatigue and shear, and strain may cause bolts to elongate, crack and fail. If a fastener is erroneously opened and a rigid member, such as a beam, is present then it may fail with catastrophic consequences and even fatalities. In a derrick, for example, excessive vibration due to drilling, jarring or stuck pipe can cause failure of structural elements such as elevator rails. Occasionally a bolt is loosened due to excessive and prolonged vibration with disruptive and serious consequences such as failure of a mechanical member, and a falling object.

In the context of the oil industry, risers are assembled from large sections of tubular and used to connect wellheads with platforms. Platforms can include production platforms, floating production and storage offshore (FPSO) vessels, mobile offshore drilling units (MODU) such as drill-ships, semi-submersibles or jack-ups. The riser sections are tubulars, for example pipes manufactured from steel, alloy or composite, that conduct formation fluids to the surface, or, during drilling, conduct drilling fluids to or from the well-bore. In injection wells risers may be deployed to inject fluids into the formation. Risers may connect networks of flow-lines and manifolds from multiple wells. Risers come in various dimensions and specifications and can include large sections for submarine deployment at high pressure. When assembled, riser sections are stacked and sealed flanges couple sections of riser into continuous conduits that covey fluids at pressure and preserve the integrity of the well and of the platform. Therefore, the condition of each section riser is critical and sections of riser are routinely inspected for defects, corrosion and leaks. The thickness, and condition of the fasteners such as bolts, are of particular importance. Non-destructive inspection (NDT) techniques, visual inspection and record-keeping are among the methods used for recording and validating the integrity of connections. Various measurements, such as bolt cross section thickness, surface condition and manual records may be used in calculations and models to analysis the condition and integrity of riser bolts. These methods may form part of special periodic service (SPS) or regulatory regimes to verify riser integrity and the safety of operations. For example, a record may be kept for each section of riser including logs for deployment underwater, tallies including depth and duration of deployment.

Riser sections, when not in use, are stacked on the deck of the vessel or platform. These sections of riser are labelled, often manually. The location, type and history of each section of riser is noted and generally recorded manually. These logs are inspected and produced whenever riser is deployed or validated by third parties as part of SPS or a certification process. The riser sections may be deployed permanently on a particular MODU or platform, or moved to other locations for operations. These sections of riser may be employed globally or in a particular region. Riser sections have a significant value and may be periodically reconditioned or repaired by manufacturers or contractors. an oil or gas rig. Accordingly, there is a requirement to monitor each section of riser throughout its lifetime both while deployed and in storage.

To validate the integrity of structures, routine inspection of fasteners may be obligatory and is frequently conducted in accordance with standards from industry bodies such as API, NAS, ASME, ASTI, BSEE. Similarly, inspection and testing may be required as part of obtaining or maintaining vessel class or type approval with organisations such as DNV-GL, ABS (American Bureau of Shipping) or Lloyds Register. Bolts and fasteners are used subsea temporarily and permanently. For example, bolts securing sections of lower marine riser packages, and BOPs (blowout preventers), may be inspected routinely as part of maintenance and verification during and between operations. This need to confirm the integrity of fasteners on joints in the structure is crucial.

Manual inspection by teams of specialists may include performing various tests of torsional rigidity and torque. These inspections are continuous during the lifetime of an offshore structure, be it a platform or mobile offshore drilling unit (MODU). These inspections can be labour intensive, hazardous and time-consuming requiring extensive training and safety precautions. Teams of technicians will manually inspect a structure and perform tests on fasteners for torque and rigidity by means of rope-access, or ladders or using a cherry-picker or otherwise, in often dangerous conditions. The technicians are exposed to weather, dropped objects, and other hazards from working at height. Interruptions to operations can be costly causing delays to the critical path of a drilling programme or production schedule. These serious incidents have created a requirement for a solution that can remotely, and without manual inspection by means of rope access or interruption of service and downtime for example, detect and confirm the status of a fastener in the derrick or on equipment.

Accordingly, there is a need for a device which will reduce the necessity for manual inspection of fasteners and fastener assemblies, thereby improving worker and operational safety, and reducing delays due to inspections. There is further a need for a device which may be easily retrofitted or installed either on, or in proximity to, a fastener and capable of permanently monitoring the integrity of the fastener while periodically transmitting, wirelessly or by other means, the status of the fastener to a controller for analysis and display of status, changes and trends.

GENERAL DESCRIPTION

According to an aspect of the invention, there is provided a sensor unit for a fastener assembly, the sensor unit comprising a mounting arranged to rigidly attach the sensor unit to, or adjacent to, a fastener assembly, and a sensor, that is an optical flow sensor or an inductive sensor, configured to sense movement of the fastener assembly.

In this way the monitoring device has the advantage of reducing the frequency of manual inspection, and directing technicians to maintain certain fasteners based on analysis of data and trends, predictive maintenance and critical changes in status. Benefits would include reduced labour costs, defrayed expenses, minimised HSE risk and fewer interruptions of operations for scheduled maintenance.

The fastener assembly may be of any type, including those discussed above.

In an embodiment, the sensor unit further comprises a processor arranged to process the output of the sensor to detect loosening of the fastener assembly and to output a signal representing the status of the fastener assembly. By providing an integrated processor in the sensor unit, a simple monitoring signal can be generated and transmitted by the sensor unit. This will be more robust and less prone to data loss than transmitting the output of a sensor directly.

In an embodiment, the sensor unit further comprises a wireless communication unit arranged to communicate the signal. Communicating wirelessly is particularly advantageous when the sensor unit is mounted in an inaccessible or remote location.

In an embodiment, the sensor is configured to sense angular rotation or axial movement of the fastener assembly. Angular rotation and axial movement are indicative of loosening or potential failure of the fastener assembly, and so detecting this type of movement is particularly important.

In an embodiment, the sensor is configured to sense angular rotation or axial movement of the fastener assembly with respect to an object which the fastener assembly fastens. This type of movement may be indicative of stretching or fatigue of the fastener assembly, and detecting it promptly can prevent failure of the fastener assembly.

In an embodiment, the sensor is configured to sense angular rotation or axial movement of parts of the fastener assembly with respect to each other. This type of movement may indicate loosening of the fastener assembly, for example a nut losing on its respective bolt.

In an embodiment, the mounting is arranged to rigidly attach the sensor unit to the fastener assembly. In an embodiment, the sensor unit is mounted to the fastener assembly. This can be advantageous in connecting the sensor unit to the fastener assembly so that it remains in the correct position for robust sensing with respect to the fastener assembly.

In an embodiment, the fastener assembly includes an engagement portion which engages an object which the fastener assembly fastens, and the mounting is arranged to rigidly attach the sensor unit to the engagement portion of the fastener assembly. An engagement portion, such as a nut or the head of a bolt, will typically have a standardised shape and dimension, and therefore be particularly convenient as an attachment point.

In an embodiment, the sensor is an optical flow sensor configured to sense angular rotation of the engagement portion with respect to the object. Optical flow sensors are well-developed and provide a reliable method for detecting movement, particularly movement perpendicular to an axis of the sensor.

In an embodiment, the sensor is an inductive sensor configured to sense axial movement of the engagement portion with respect to the object. Inductive sensors are advantageous because they are particularly suited to sensing movement in a direction parallel to an axis of the sensor, and can also be used to detect changes in material properties as well as movement.

In an embodiment, the mounting is arranged to rigidly attach the sensor unit adjacent to the fastener assembly. In an embodiment, the sensor unit is mounted adjacent to the fastener assembly. Depending on the environment or design of the fastener assembly, it may be more convenient to locate the sensor unit adjacent to, rather than directly on, the fastener assembly. For example, the sensor unit may attached to a surface adjacent to the fastener assembly.

In an embodiment, the sensor is an inductive sensor configured to sense angular rotation of the engagement portion with respect to the object. When an inductive sensor is located adjacent to the fastener assembly (e.g. off the axis of a bolt) it can detect angular rotation more robustly due to changing separation of the engagement portion from the sensor.

In an embodiment, the sensor unit further comprises an eddy current sensor configured to monitor the condition of the fastener assembly. In an embodiment, the sensor unit further comprises a processor arranged to process the output of the eddy current sensor. An eddy current sensor can be used to detect changes in the condition of the fastener assembly that may not cause movement of the fastener assembly, such as metal fatigue.

According to an aspect of the invention, there is provided a sensor unit according to the invention in combination with a fastener assembly. This may improve the convenience of installing the sensor unit, for example if the sensor unit is integrated into the fastener assembly.

According to an aspect of the invention, there is provided a method of sensing the status of a fastener assembly, the method comprising sensing movement of the fastener assembly by a sensor, that is an optical flow sensor or an inductive sensor rigidly attached to, or adjacent to, the fastener assembly. In an embodiment, the method further comprises processing the output of the sensor to detect loosening of fastener assembly and outputting a signal representing the status of the fastener assembly, and wirelessly communicating the signal. This method provides corresponding advantages to the sensor unit according to the invention.

BRIEF DESCRIPTION OF THE FIGURES

Embodiments of the present invention will now be described by way of non-limitative example with reference to the accompanying drawings, in which:

Figure 13:
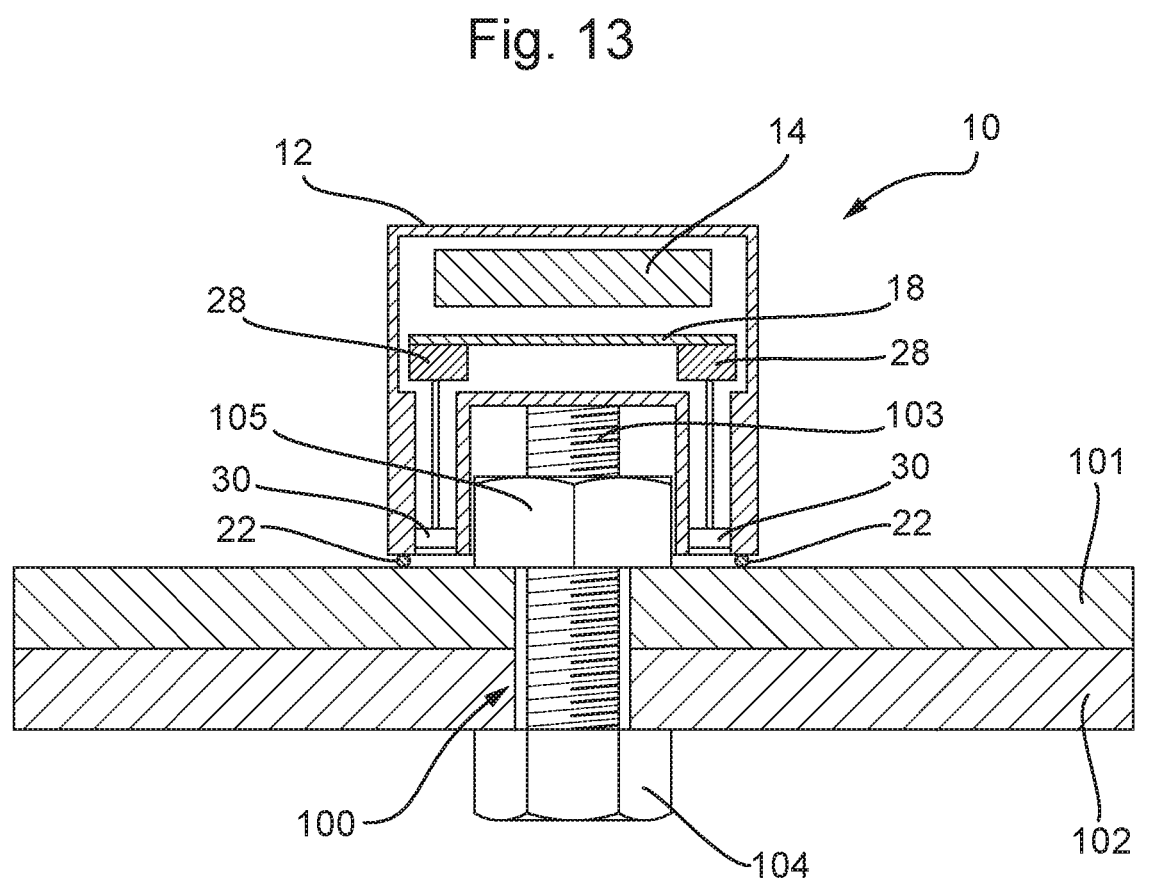

FIG. 13 is a schematic of a sensor unit using an inductive sensor and mounted to a nut of the fastener assembly to sense rotation of the fastener assembly relative to the object which the fastener assembly fastens;

FIGS. 17(*a*) to 17(*c*) show views of the sensor unit of FIG. 16 mounted to a fastener assembly for detecting an axial orientation or angular rotation to determine the status or behaviour or functionality of a fastener assembly;

DETAILED DESCRIPTION

Figure 1A:
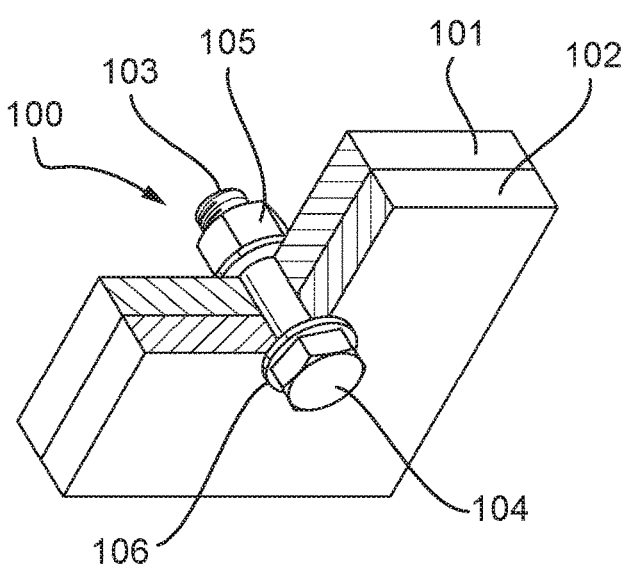
FIGS. 1(*a*) to 1(*d*) depict the typical configuration of a standard fastener assembly.
Figure 1B:
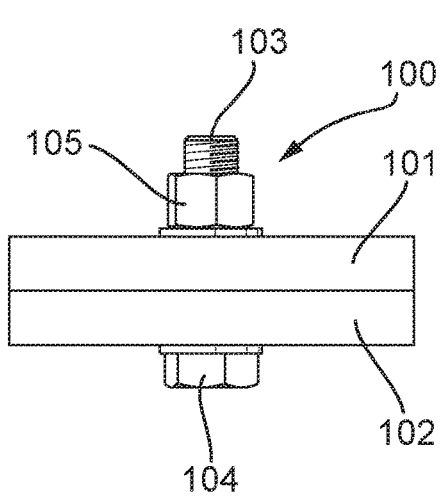
Figure 1C:
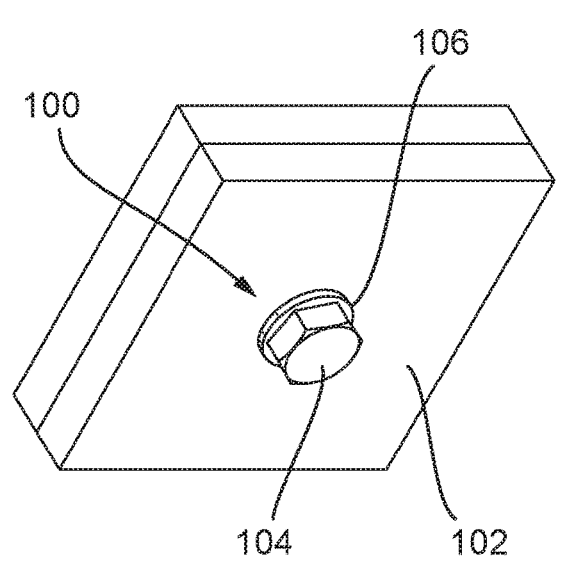
Figure 1D:
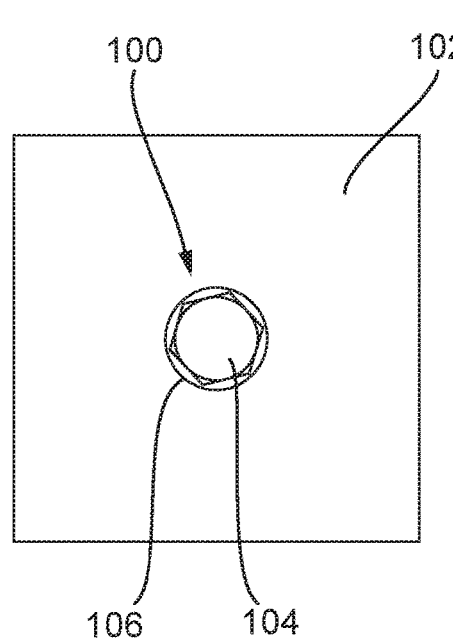

The present disclosure concerns a sensor unit 10 for a fastener assembly 100. The sensor unit 10 may also be known as a monitoring unit, or a sensor assembly. The sensor unit 10 may be a wireless sensor unit 10 that may be retrofit to a fastener assembly 100 for detecting the orientation, and confirming the status, of a fastener, bolt, cap, bolt head, stud, screw, cap screw, washer or rivet for a rigid structure or mounting a rotating member. Applications of the sensor unit 10 may be for fasteners that are particularly critical, such as in hydrocarbon processing or high-pressure vessels or flammable atmospheres, or in locations that are difficult to reach, such as subsea risers or wind turbine blades. Equally, the sensor unit 10 may be applied to fastener assemblies 100 that are frequently made and broken, such as on connections for subsea drilling risers. The sensor unit 10 may be applied to monitoring of structures within the derrick that experience high shock, vibration or strain such as bolts securing guide rails for top-drives. Similarly, the sensor unit 10 may be mounted on fastener assemblies 100 on linkage mechanisms of a top drive, or on wheels or rotating machines, or on flanges, to confirm the status, integrity and condition of the equipment, rotating machinery and pipework, and to avoid dropped objects or failures of equipment in service inside the derrick or around an installation. Likewise, the sensor unit 10 could be used to monitor joints, fasteners, rivets, bolts and welds and to demonstrate compliance with API recommended practice 4G for operation, inspection, maintenance and repair of drilling and well servicing structures, and 4F for drilling structures. The sensor unit 10 could be deployed wherever fasteners are critical to integrity of connections and joints. For example, in difficult to inspect joints such as wind turbine blades, pylons, monopiles, railway joints, subsea bolts, subsea risers, subsea Christmas trees (x-trees), surface x-trees, choke lines, on fasteners or connections and flanges used in flammable atmospheres such as hydrocarbon processing, throughout hydraulic fracturing fleets, lower marine riser packages or jackets. In particular, failure of H4 bolts used on subsea drilling risers and lower marine riser packages can lead to leaks of drilling fluids and hydrocarbons or cata-strophic loss of well control and a blow-out. The sensor unit 10 may be exploited as a monitoring system for a section of drilling or production riser. The sensor unit 10 may be utilised wherever fasteners are critical and frequently made and broken such as on bolts connection sections of drilling riser.

In operational use the sensor unit 10 may eliminate the need for a spotter in the derrick checking for loose joints, bolts and fasteners that are considered a DROPS risk. The sensor unit 10 could be used to track the status of a fastener in service on a critical structure, flange, plate, joint, valve, pipework or machine and its output used in feedback to plan and direct maintenance and prevent failure in a timely fashion.

The fastener assembly 100 depicted in FIG. 1 comprises two plates or surfaces 101 and 102 to form a joint, a threaded bolt 103 or screw, a head 104, washers 106 and a nut 105. Similarly, this could form a rivet or screw. Optionally, the fastener assembly 100 may be a riser fastener.

Figure 2:
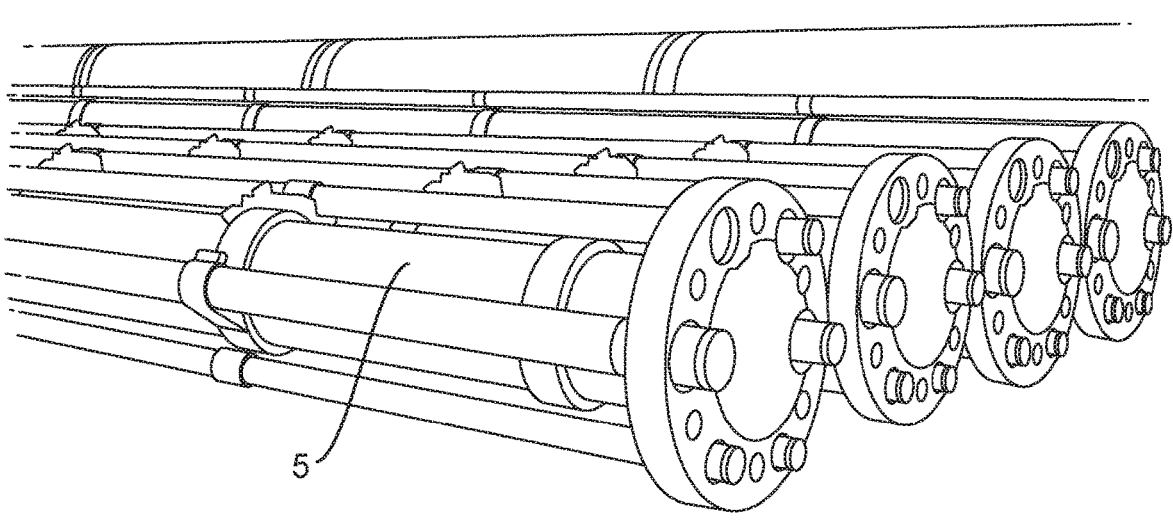
FIG. 2 shows lengths of riser section of the type on which the sensor unit may be used.
Figure 3:
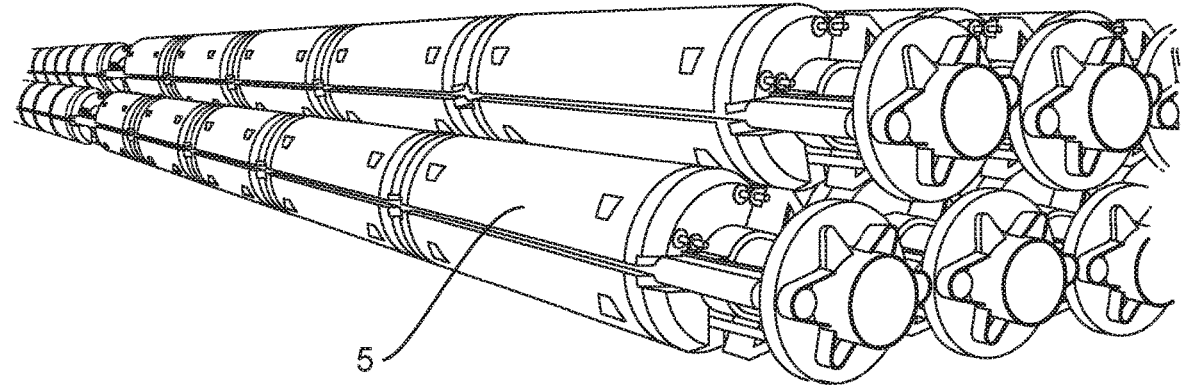
FIG. 3 shows lengths of riser section with buoyancy modules of the type on which the sensor unit may be used.
Figure 4:
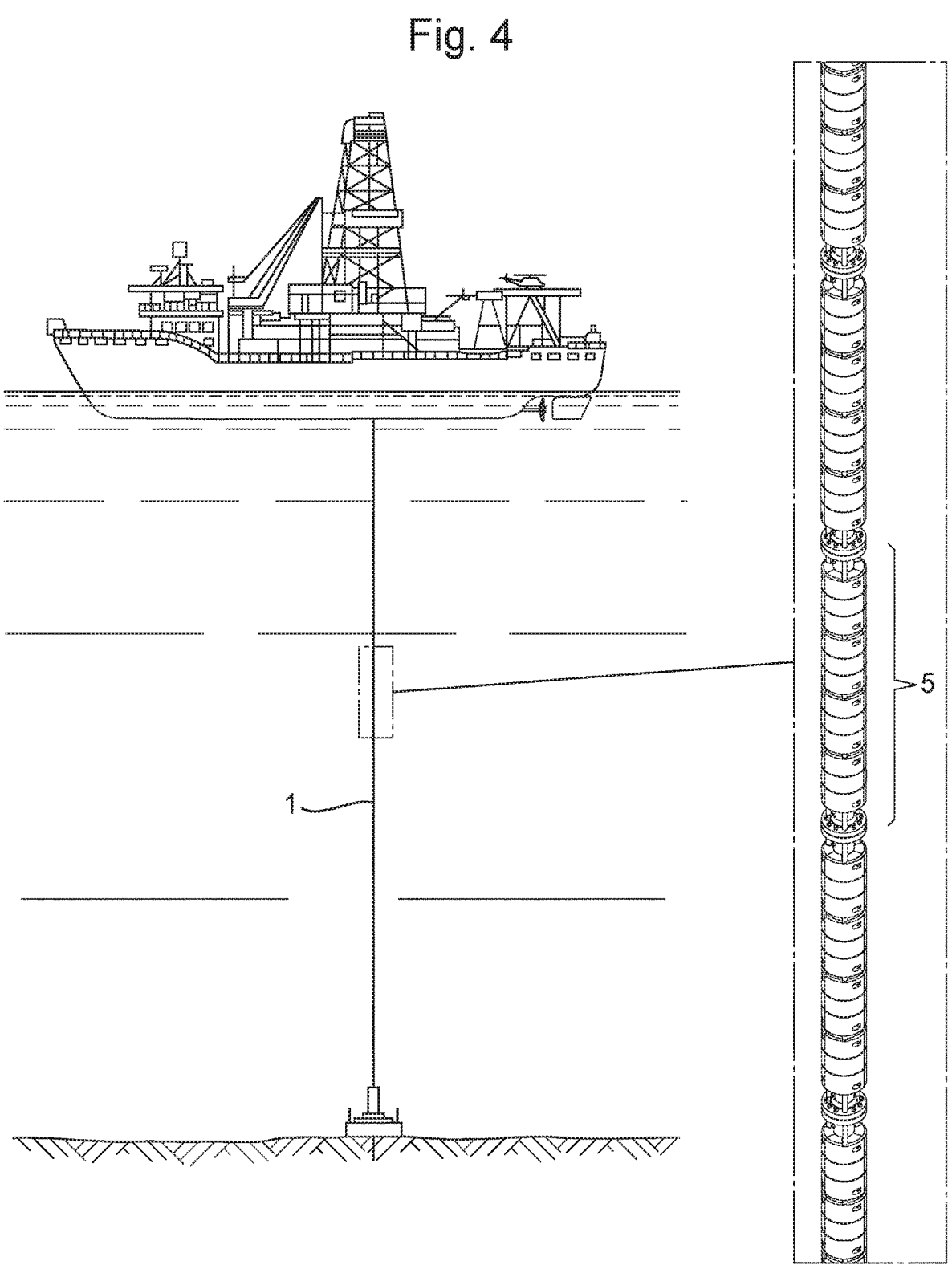
FIG. 4 shows a riser assembly in use.

FIG. 2 shows examples of riser sections 5 commonly used in the oil and gas industry, which may be joined together using fastener assemblies 100 such as that shown in FIG. 1. FIG. 3 shows further examples of riser sections 5 including buoyancy modules. FIG. 4 shows a riser 1, composed of plural riser sections 5, in use and connected to an oil derrick.

Figure 5:
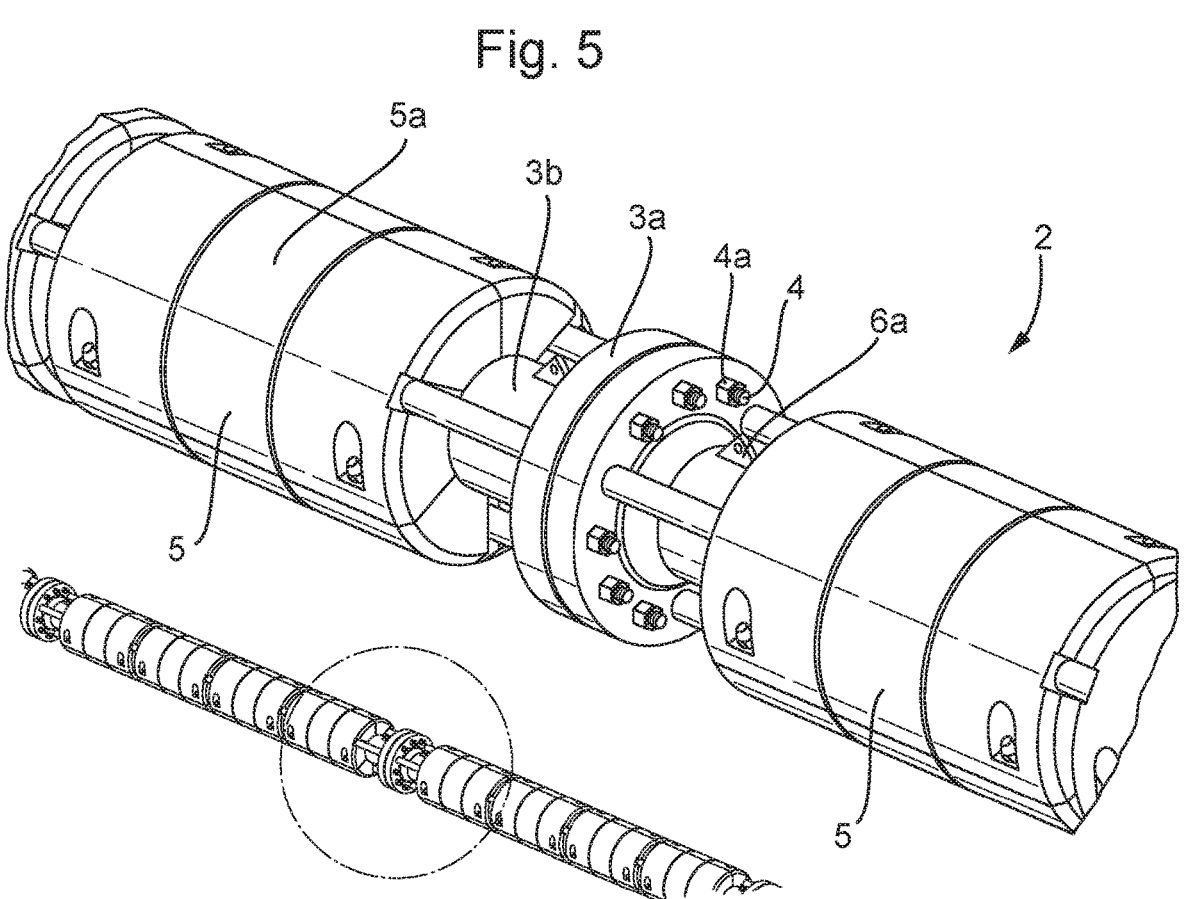
FIG. 5 shows a detailed view of a riser assembly, and fastener assemblies thereon.

FIG. 5 shows the construction of a standard riser 1, each with plural riser sections 5. The riser sections 5 are provided each as part of respective riser assemblies 2 mounted in arrays along the riser 1. Each riser assembly 2 may comprise two or more riser sections 5.

Two types of riser assembly 2 will be described, the first type being for drilling and the second type being for pro-duction. The two types of riser assembly 2 have a construc-tion that is generally the same, except that the specifications of the riser sections 5 are different, as appropriate to retain different types of fluids, with a corresponding change in width and materials of the pipe wall from which the riser sections 5 are fabricated. Therefore, a common description using common reference numerals is given. The following description applies equally to both the first and second types of riser assembly 2, and indeed any riser assembly 2, except where specific reference is made to one of the first and second types.

The riser assembly 2 comprises a riser section 5 that comprises a riser flange 3a and an elongated body 3b extending between the flanges 3a. The riser assembly 2 is coupled using studs (also referred to as bolts) 4 and nuts 4a attached through stud apertures in the riser flange 3a. The riser assembly 2 also comprises buoyancy jackets 5a and moorings 6a, both secured to the riser section 5.

The sensor unit 10 may be retrofitted, or integrated with, riser stud 4 or nut 4a. The sensor unit 10 comprises a housing 11, a power source 14, one or more sensors and one or more light sources, acoustic or wireless communications means.

The sensor unit 10 may optionally be mountable on the riser section 5, stud 4, nuts 4a or flange 3a of a riser assembly 2, which may be for example of the types described above with reference to FIG. 5. For example, the sensor unit 10 may be provided integrally with the riser section 5 or stud 4 or nut 4a during manufacture. Alterna-tively, the sensor unit 10 may be configured to be attached to a pre-existing riser section 5.

The sensor unit 10 comprises a mounting arranged to rigidly attach the sensor unit 10 to, or adjacent to, a fastener assembly 100. The sensor unit 10 may optionally comprise a securing member, which acts as the mounting. The mount-ing may be configured to secure the sensor unit 10 to the riser section 5, fastener assembly 100, stud 4 or nut 4a.

Figure 6:
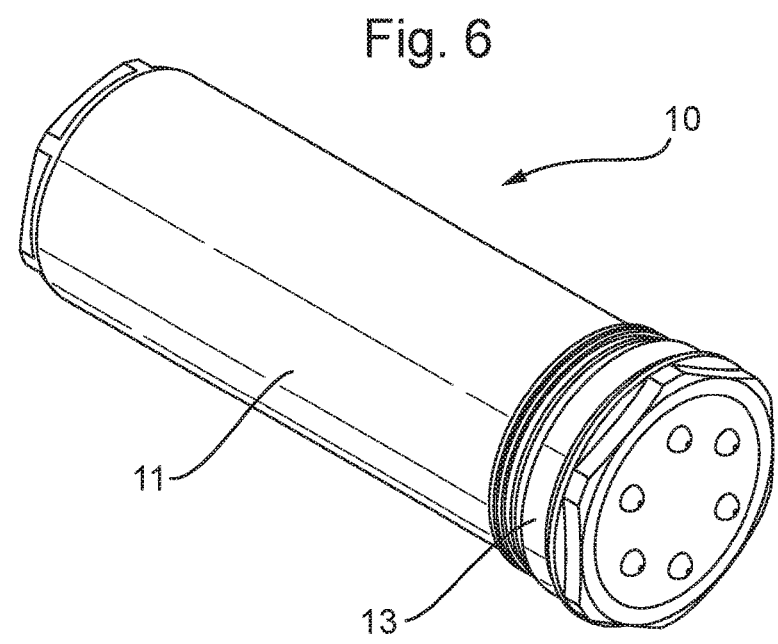
FIG. 6 shows a perspective view of a sensor unit with a body and lid.
Figure 7:
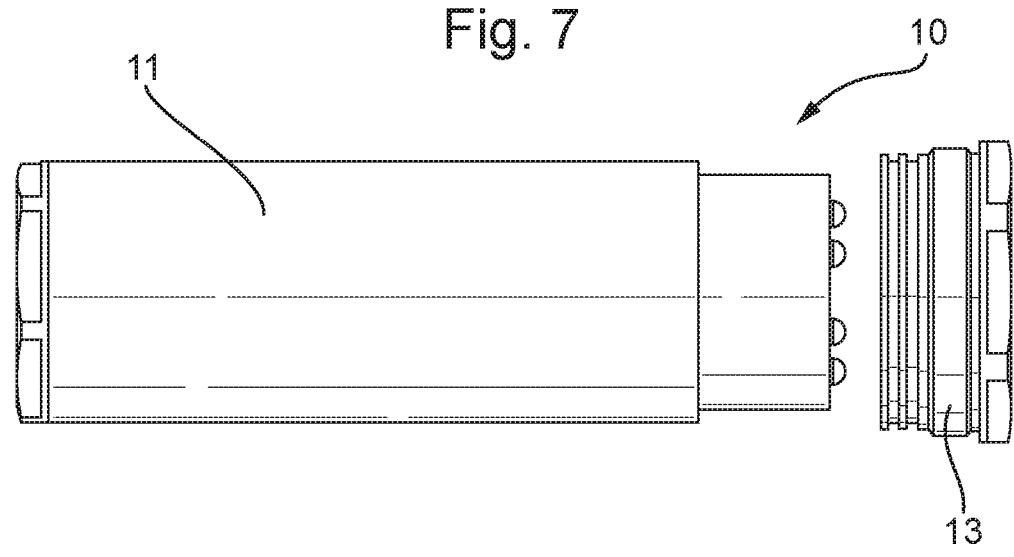
FIG. 7 shows a side view of a sensor unit with a body and lid.

FIGS. 6 and 7 illustrate an embodiment in which the housing 11 of the sensor unit 10 may be inserted through a hole in the riser section 5, such as a bolt hole or stud aperture, and a mounting provided on the opposite end of the hole to the housing 11 and configured to secure the housing 11 to the riser section 5. For example, the securing member may be configured to screw into a thread inside the housing 11. However, any securing system may be used to secure the mounting to the housing 11. Alternatively, the housing 11 may be provided with a screw portion, and the sensor unit 10 configured to be screwed into a thread inside the riser section 5. Alternatively, the sensor unit 10 may be provided with holes through which bolts may be threaded to retain the sensor unit 10. Finally, the housing 11 may include holes, formed integrally, or plate that may be welded for permanent attachment to the riser fastener assembly 100 to provide a continuous record of riser fastener deployment, location and condition. Thus, a compact and easy to install sensor unit 10 may be provided. The sensor unit 10 may optionally further comprise a backup retention device that is configured to attach the sensor unit 10 to a component of the riser fastener assembly 100. For example, the backup retention device may comprise a strand of wire or rope attached to both the riser section 5 and the sensor unit 10. Thus, if the mounting fails, the backup retention device ensues that the sensor unit 10 does not fall and damage other equipment or personnel. A safer sensor unit 10 may thus be provided.

Optionally the sensor unit 10 may be integrated into the riser section 5, or bolts 4, or nuts 4a, or the flanges 3a of the riser section 5. In this embodiment, the sensor unit 10 is provided as a package that may be mounted into the fastener of the riser section 5 inside a suitable cavity provided inside the fastener assembly 100. The cavity may be in any part of the fastener assembly, e.g. the head of the bolt 4, or the nut 4a. The head and nut 4a may also be referred to as an engagement portion. The cavity may also be provided adja-cent to the fastener assembly 100, e.g. within the flange 3a.

The sensor unit 10 may be an OEM device that incorpo-rates all of the features disclosed herein, but which can be inserted into this cavity inside the body of the fastener or flange 3a or bolt 4. The cavity may have access via a threaded hole such that sensor unit 10 can be replaced, for example when the battery is depleted or maintenance is required. The cavity may be preferably cylindrical and the sensor unit 10 may be a package with a threaded exterior. The sensor unit 10 may be inserted into the cavity and rotated into position until secure. The hole may be sealed with a lid 13 or a glue or epoxy. The sensor unit 10 may be encapsulated and secured inside the buoyancy jacket 5a using a resilient member, threaded parts, screws or a suitable potting compound, glue or epoxy.

FIGS. 8 to 20 depict embodiments of the sensor unit 10 in which the mounting of the sensor unit 10 is arranged to rigidly attach the sensor unit 10 to the fastener assembly 100. For example, the sensor unit 10 may be mounted to the fastener assembly 100. Advantageously, the sensor unit 10 is mountable on a component of the fastener assembly 100 such as a bolt head 104, screw, cap, washer or nut 105. In some embodiments, the fastener assembly 100 may include an engagement portion, for example a bolt head 104, washer, or nut 105, which engages an object which the fastener assembly 100 fastens, and the mounting may be arranged to rigidly attach the sensor unit 10 to the engagement portion of the fastener assembly 100. For example, in FIGS. 8, 11, and 12, the sensor unit 10 is mounted to the head 104 of the bolt 103 of the fastener assembly 100. In FIGS. 9, 10, and 13, the sensor unit 10 is mounted to a nut 105 of the fastener assembly 100. In other embodiments, the sensor unit 10 may be mounted to the bolt 103.

In the embodiments of FIGS. 8 to 11, the sensor unit 10 comprises a casing 12 (equivalent to the housing 11 of FIGS. 6 and 7), a battery 14, and a circuit board 18. An O-ring 22 is present at the bottom of the sensor unit 10 to provide a seal against the surface of the plate 101 around the fastener assembly 100. The O-ring can protect internal components of the sensor unit 10, particularly when the sensor unit 10 is used on fastener assemblies 100 in hazardous environments, underwater, or similar.

In a preferred embodiment, the sensor unit 10 is packaged such that it may be retrofitted rapidly to a fastener assembly 100, for example by mounting as a cap over the head 104 and/or nut 105 of a fastener. Advantageously, the sensor unit 10 is mountable on the riser fastener assembly 100, for example retrofitted onto the head 104 or nut 105 of a H4 riser bolt 103. Mounting the sensor unit 10 on the riser section 5 means that the sensor unit 10 detects the location and orientation from the motion or position of the riser 1 allowing the use of a sensor that is simpler and of lower-power than a manual inspection and record keeping. As such, the riser 1 is capable of being run for extended periods of time without offline inspection or NDT.

Mounting the sensor unit 10 on the fastener assembly 100 means that the sensor of the sensor unit 10 detects and confirms the position and axial orientation of the bolt head 104 and nut 105, on either side of a structure or plate 101, allowing the comparison of sensor data to detect changes in relative axial orientation or angular rotation. Similarly, sensors may measure tilt or alignment to detect distortion, buckling or fractures. The sensor unit 10 is attached to a fastener, bolt 103, or rivet and wirelessly monitors the axial orientation of the bolt 103, rivet or fastener in the same manner as a visual indictor. The sensor unit 10 may be mounted with the bolt 103 during assembly of a structure, or retrofitted subsequently, to measure, process, analyse, locally determine and transmit the status of a fastener. Alternatively, the sensor unit 10 may be integrated with the fastener assembly 100 during manufacture. The sensor unit 10 may be formed integrally into a component, or components, of a fastener assembly 100 and inserted into a recess of a bolt 103, head 104, stud, clip, nut 105, or washer. The component of the fastener assembly 100 integrating the sensor unit 10 may be manufactured from composite, non-metallic, laminate or partially non-metallic materials in order to permit the transmission and reception of electro-magnetic radiation. In this manner, the sensor unit 10 incorporating sensors for detecting changes in absolute or relative movement between a component and a fixed sur-face, or between a component and another component, may be integrated into for example a composite nut 105 or bolt-head 104 to alert remotely to changes in the integrity or status or behaviour or functionality of a fastener assembly 100 or rigid structure.

FIG. 14 depicts various views of another embodiment of the sensor unit 401. The sensor unit 401 incorporates a mounting arrangement that may be retrofitted to a fastener assembly 100 by clamping around a head 104 or nut 105. The sensor unit 401 has a recess 403 that can be clamped over an existing bolt head 104 (but not a nut 105 as there is no hole for the bolt 103 to pass through). Various methods can be used to retain the sensor unit 401 such as a grub screw 404 coming in from the sides 402 and being tightened to the hex form of the bolt head 104 (see FIGS. 14(a) and 14(b)). Alternatively, a cam 405 could be used to couple the head 104 into recess 403 (see FIGS. 14(e) and 14(f)). By indexing the cam 405 firstly bite into, and clamp, the external hex form of the head 104 but also to rotate a physical constraint 406 under the hex form and into the chamfer/undercut (see FIGS. 14(g) and 14(h)). A disadvantage to this design is that you need a dedicated recess 403 for each hex size, thereby requiring a range of sensor units 401 for every diameter of bolt head 104.

Figure 15A:
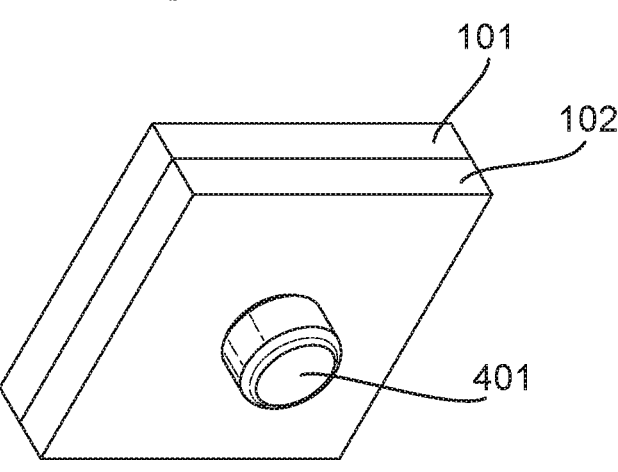
FIGS. 15(*a*) and 15(*b*) show views of the sensor unit of FIG. 14 mounted to a fastener assembly for detecting an axial orientation and angular rotation.
Figure 15B:
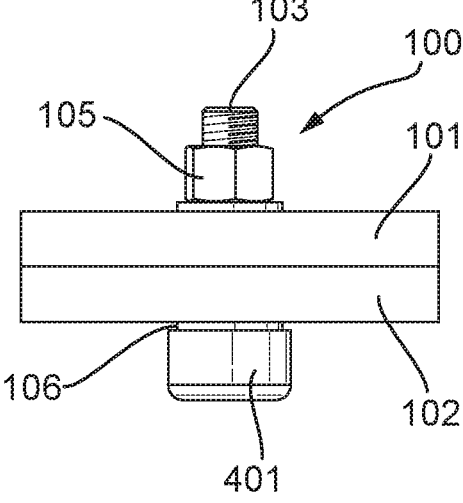
Figure 16A:
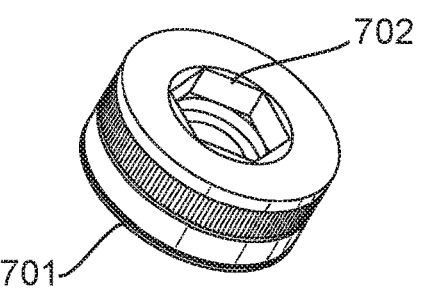
FIGS. 16(*a*) to 16(*h*) show views of a sensor unit with an alternative mounting that is mountable to a wide range of fastener assemblies.
Figure 16B:
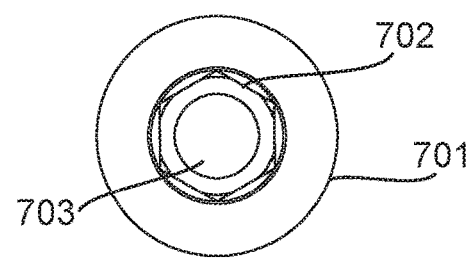
Figure 16C:
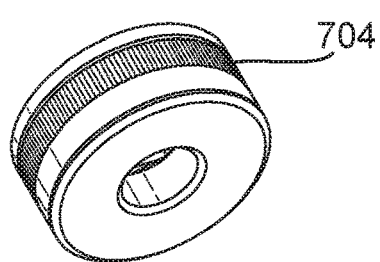
Figure 16D:
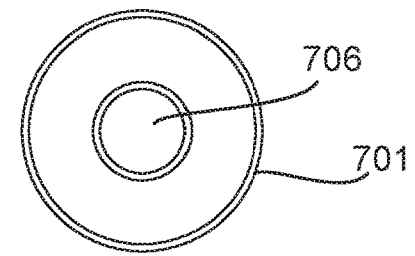
Figure 16E:
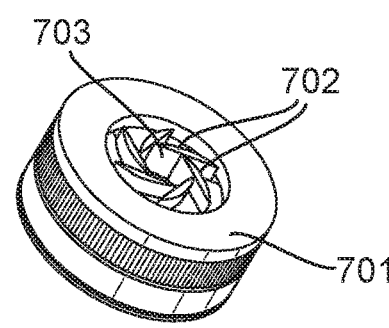
Figure 16F:
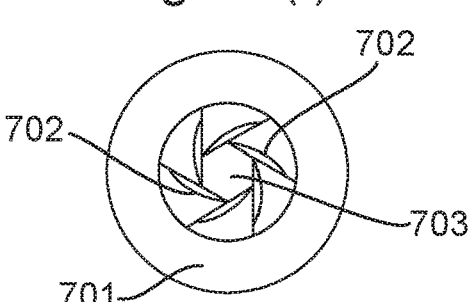
Figure 16G:
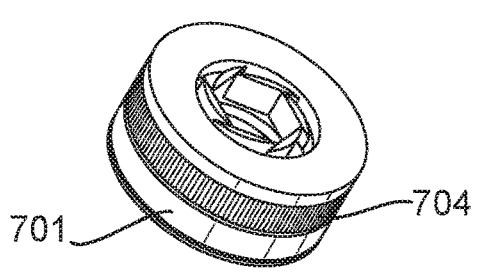
Figure 16H:
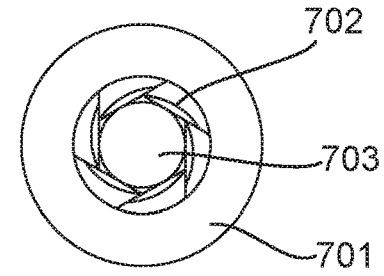

FIG. 15 depicts the sensor unit 401 in FIG. 14 mounted over a bolt-head 104 and monitoring a fastener assembly 100 including a nut 105, washer 106 and bolt 103. The device 401 incorporates sensor technologies (such as optical flow sensors) for measuring the angular rotation or axial orientation of head 104 and determines and wirelessly communicates the status of fastener assembly 100 based on detecting tiny changes in the absolute inclination, vibration, offset, tilt, angular rotation or axial orientation of head 104. Similarly, sensor unit 401 may incorporate sensor technolo-gies to measure changes or trends in axial magnetic flux, eddy current and/or conductivity to detect the propagation of cracks, corrosion or other changes to the integrity of the fastener assembly 100.

FIG. 16 depicts views of another embodiment of the sensor unit 701. Sensor unit 701 is fully retrofittable to a variety of fastener assembly 100 components across a range of hex-head diameters. A recess 703 is provided with faces 702. These faces 702 are part of leaves from an iris-style arrangement. By indexing knurled feature 704 the faces 702 clamp around the hex head and reduce the diameter of recess 703. Multiple faces 702 or iris leaves are provided that interact with a ratcheting, self-locking mechanism that is actuated by knurled feature 704. Twisting knurled feature 704 ratchets faces 702 until they lock around the head 104 or nut 105. Sensor unit 701 incorporates a hole 706 to permit a bolt 103, stud or screw to pass through sensor unit 701 as features 704 clamp around the hex head. The faces 702 may include the external features that couple and lock the hex form of head 104 but also to rotate a physical constraint 406 under the hex form and into the chamfer/undercut of the hex head 104. FIG. 17 depicts the sensor unit 701 mounted over the head 104 and nut 105 with bolt 103 passing through recess 703 and hole 706. The sensor unit 701 may be retrofitted to a range of fastener assemblies. Sensor unit 701 incorporates sensor technologies for measuring the angular rotation or axial orientation of head 104 or nut 105 and determines and wirelessly communicates the status of fas-tener assembly 100 based on detecting tiny changes in the absolute inclination, optical flow, vibration, offset, tilt, angu-lar rotation or axial orientation of head 104 or nut 105. Sensor units 701 may compare orientation of head 104 and nut 105 for relative changes in angular orientation or optical flow that are indicative of loosening or loss of torque. Similarly, sensor unit 701 may incorporate sensor technolo-gies to measure changes or trends in optical flow, axial magnetic flux, eddy current and/or conductivity to detect the propagation of cracks, corrosion or other changes to the integrity of the fastener assembly 100, as will be discussed further below.

Figure 18:
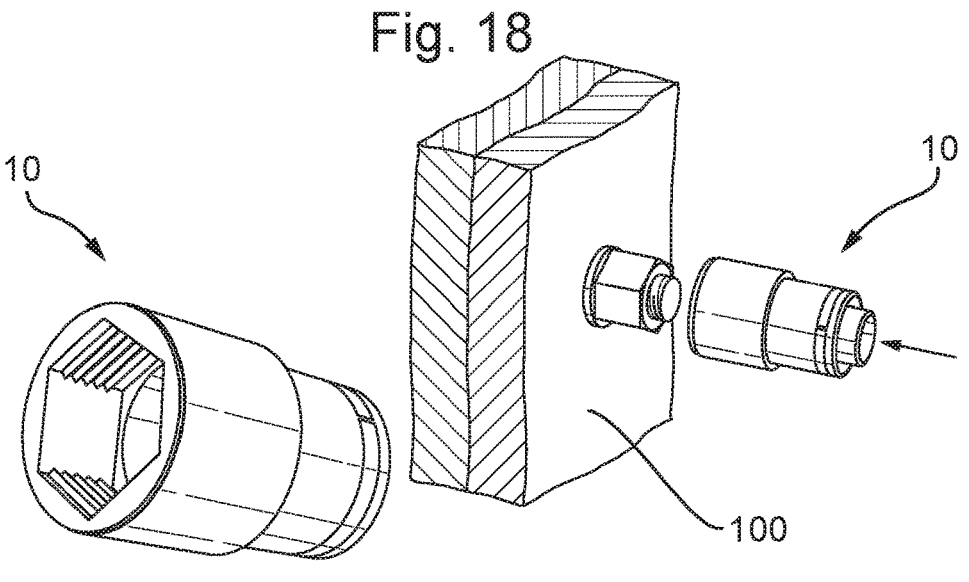
FIG. 18 shows a sensor unit which may be retrofitted to fastener assemblies of various sizes using a modular mounting arrangement and a common sensor package.
Figure 19:
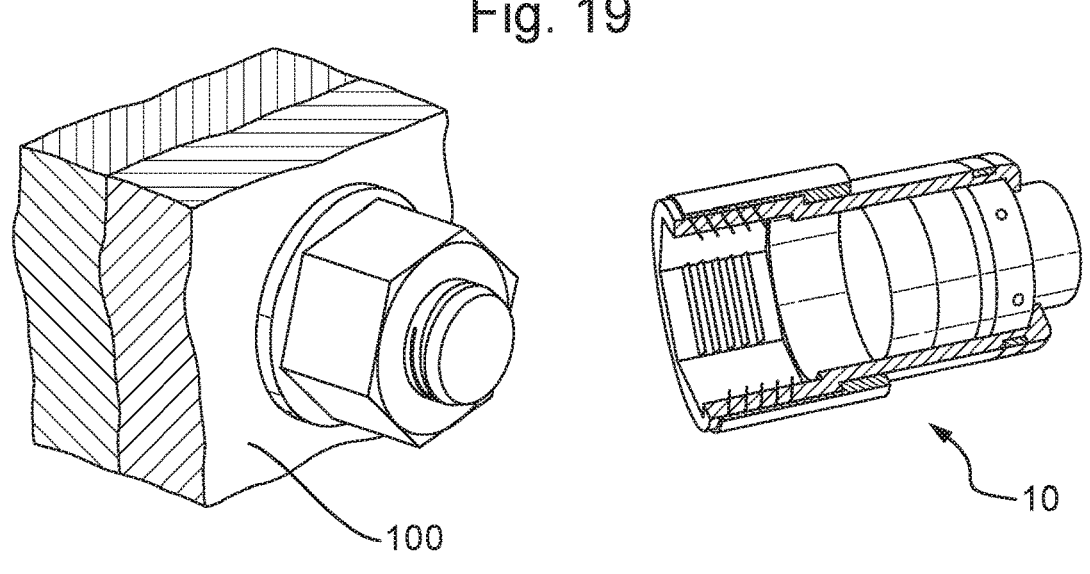
FIG. 19 shows a sensor unit of the type shown in FIG. 10 which may be retrofitted to fastener assemblies of various sizes using a modular mounting arrangement and a common sensor package.
Figure 20:
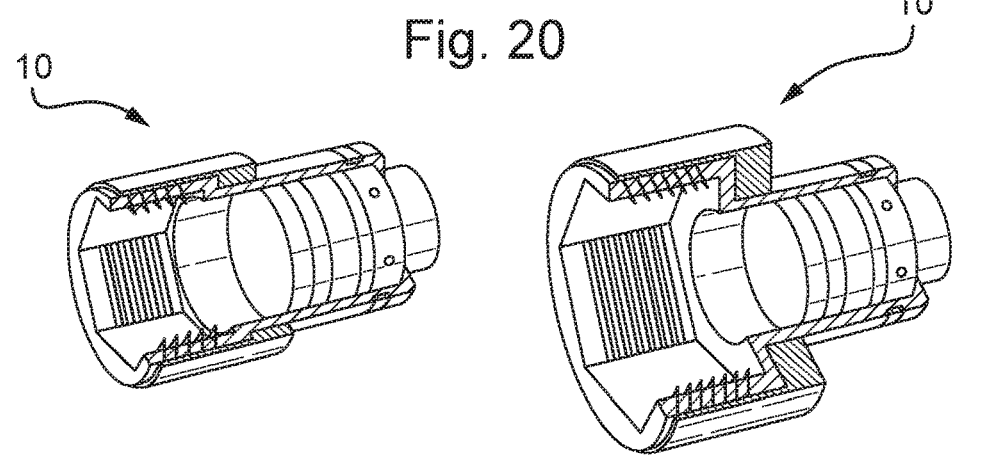
FIG. 20 shows different mounting for sensor units.
Figure 21:
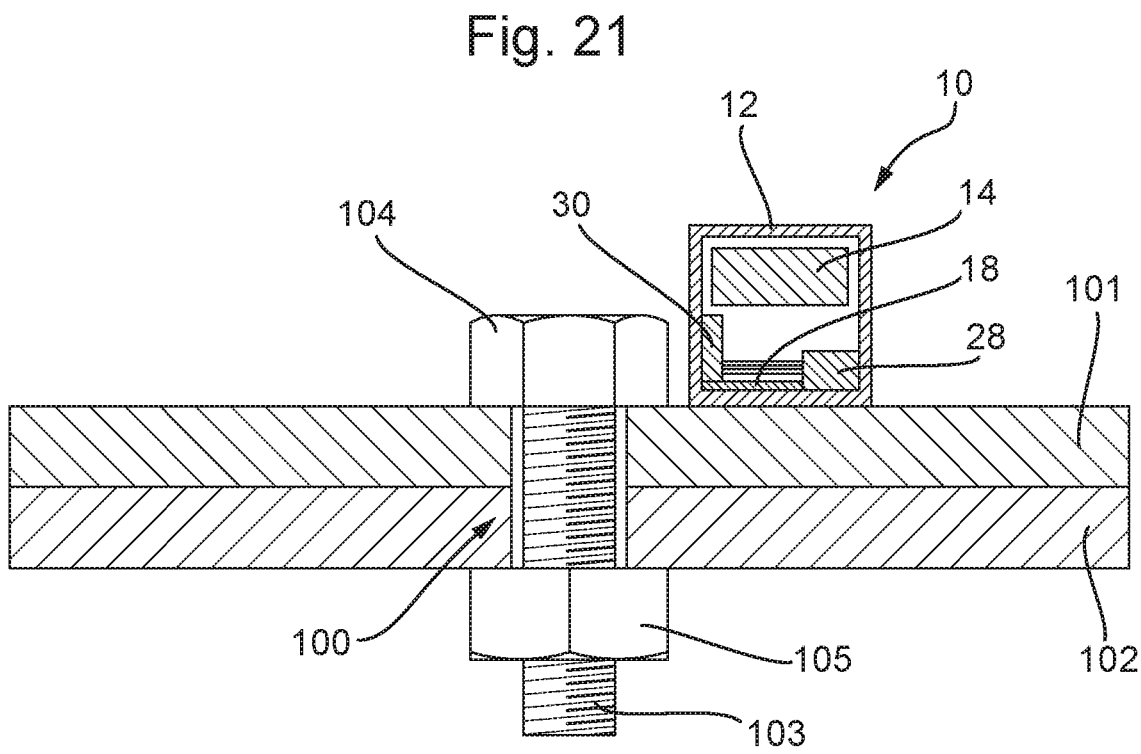
FIG. 21 shows a schematic of a sensor unit using an inductive sensor and mounted adjacent to a bolt of the fastener assembly to sense rotation of the fastener assembly relative to the object which the fastener assembly fastens.
Figure 22:
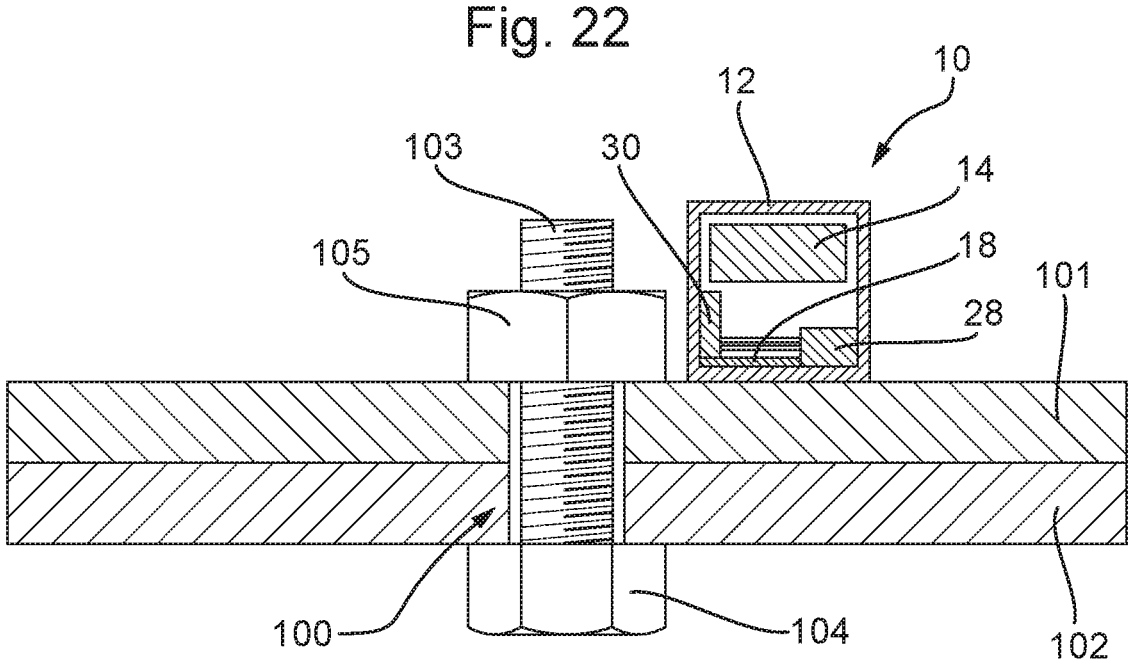
FIG. 22 shows a schematic of a sensor unit using an inductive sensor and mounted adjacent to a nut of the fastener assembly to sense rotation of the fastener assembly relative to the object which the fastener assembly fastens.

In the embodiment of FIGS. 18 to 20, the sensor unit 10 comprises a standard sensor package including the sensor of the sensor unit 10 for measuring rotation of one component of the fastener assembly 100 with respect to another com-ponent, for example the face of the bolt-end with respect to the a face of the nut 105, and/or absolute movement of the fastener assembly 100 with respect to the joint, hole or fixed structure. The standard sensor package may be mounted on an interchangeable mounting module which acts as the mounting of the sensor unit 10 incorporating resilient gripping features (or 'teeth') for securing the mounting to the fastener assembly 100. The mounting module may be selected for the fastener type, e.g. mountings for M10 through M40 etc. Additional retention may be provided by means of a lanyard.

As an alternative to rigidly attaching the sensor unit 10 to the fastener assembly 100, the mounting may be arranged to rigidly attach the sensor unit 10 adjacent to the fastener assembly 100. In other words, the sensor unit 10 may be mounted adjacent to the fastener assembly 100.

FIGS. 21 to 31 depict embodiments of the sensor unit 10 in which the mounting is arranged to mount the sensor unit adjacent to the fastener assembly 100. In such an alternative embodiment, the sensor unit is mounted adjacent a fastener assembly 100 to detect rotation of a component, or of all, of the assembly. The device of the invention may be attached adjacent to the fastener assembly 100 of interest. The device may be mounted to an adjacent rigid structure, or joint, magnetically, through welding or using an adhesive. For example, the sensor unit 10 may be attached to the object which the fastener assembly 100 fastens. Secondary or additional retention may be provided by means of a retaining wire or composite material such as a Dyneema® lanyard or net.

Furthermore, the sensor unit 10 may be mounted in a manner that it is adjacent to, but not in contact with, the fastener assembly 100 and therefore would permit access to the fastener assembly 100 for visual inspection (for example for corrosion or discolouration) and for maintenance (for example attaching a wrench to check and apply torque and/or retighten the fastener).

Figure 23A:
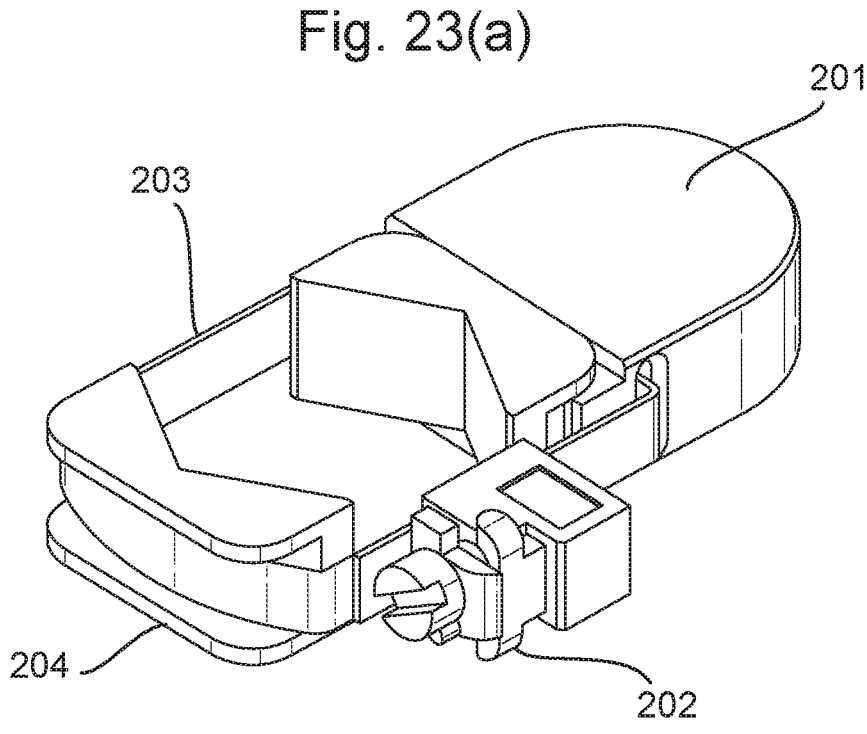
FIGS. 23(*a*) and 23(*b*) shows mountings for sensor units of the type shown in FIGS. 21 and 22.
Figure 23B:
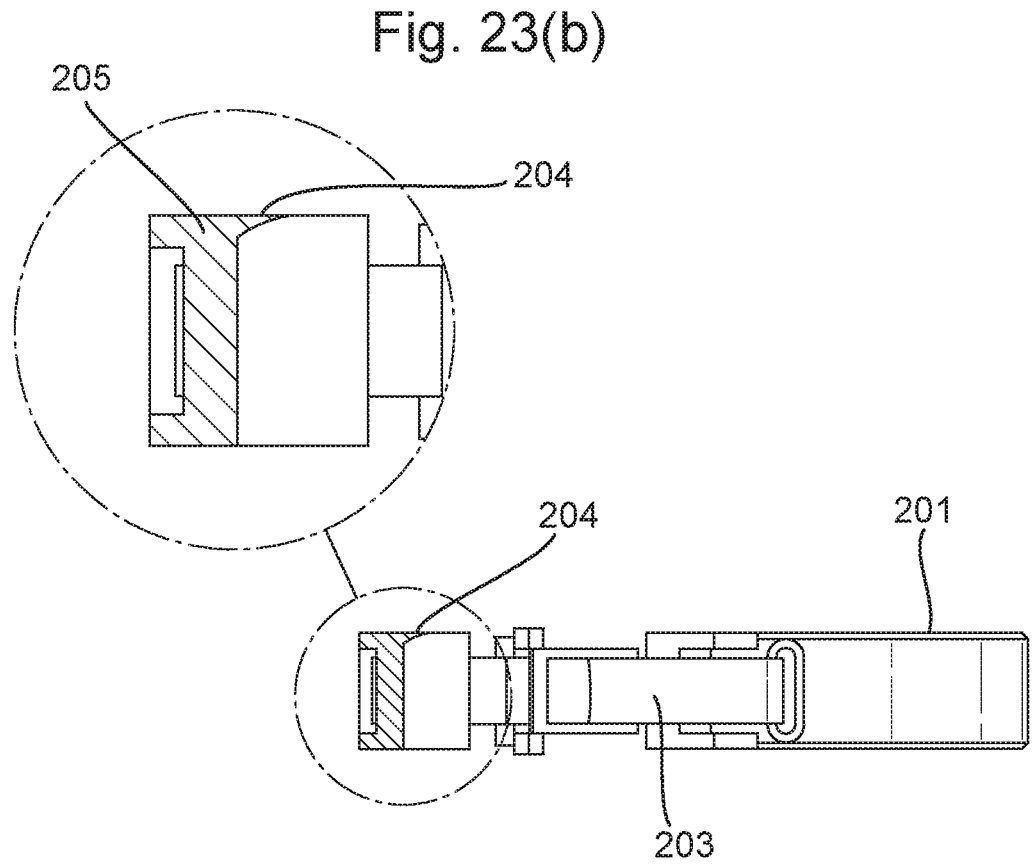
Figure 24A:
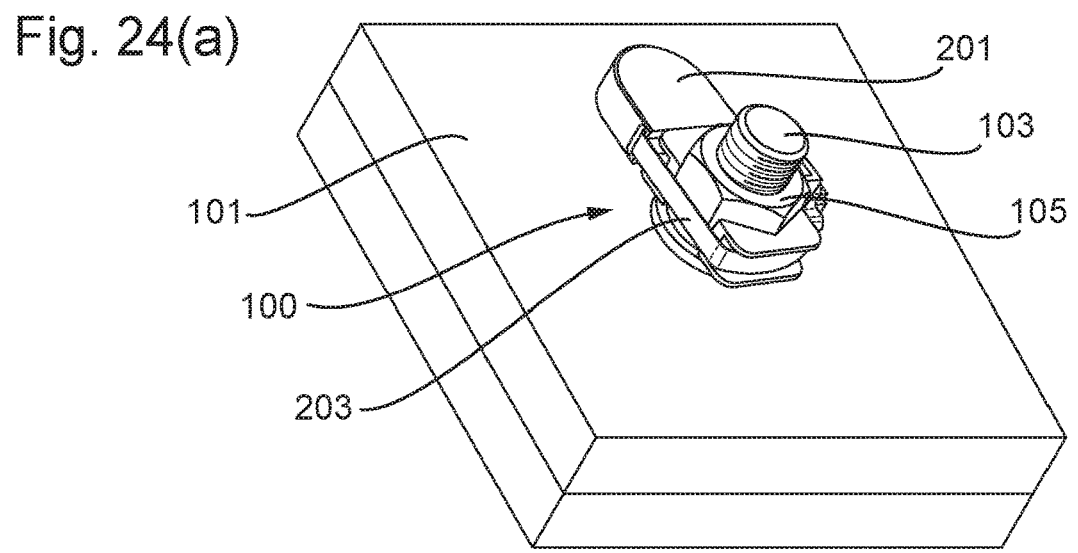
FIGS. 24(*a*) to 24(*c*) show mountings of the type shown in FIG. 23 used to attach a sensor unit adjacent to a fastener assembly.
Figure 24B:
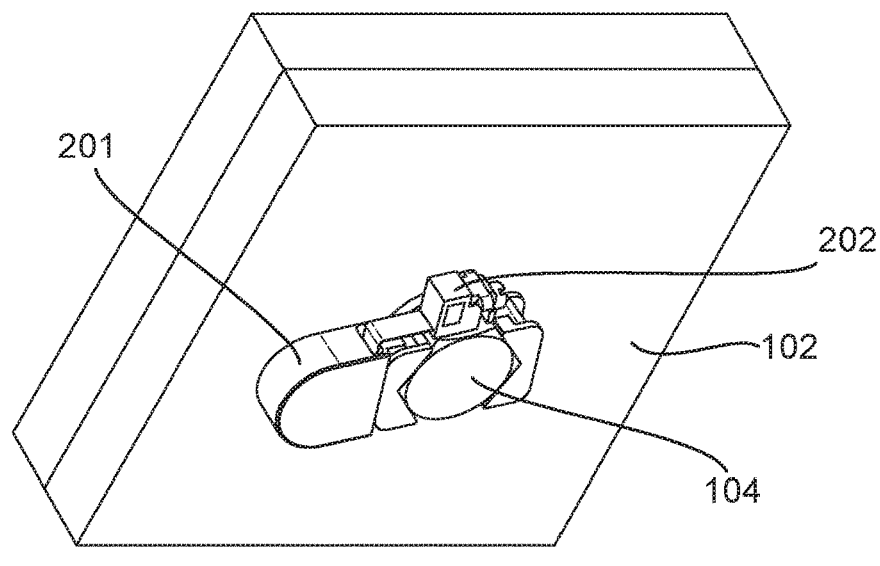
Figure 24C:
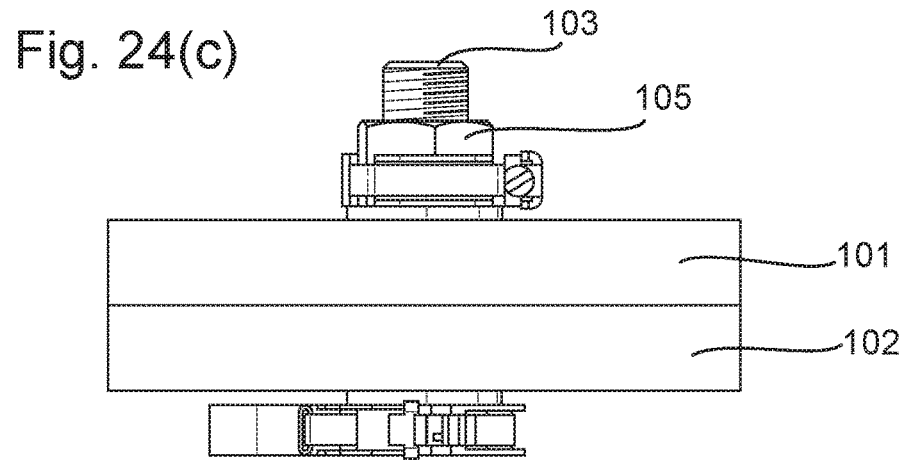

FIG. 23 comprises several views of an embodiment of the sensor unit 201. A sensor unit 201 may be mounted by means of a retrofittable mounting arrangement 204, which acts as the mounting of the sensor unit 201, including standard stainless steel (or polymer, mylar or Kevlar) banding 203 for securing to a range of fastener assemblies as shown in FIG. 24. The banding 203 may be attached to a component of the fastener assembly 100 such as the hex form of a nut 105 or head 104 and retrofitted to wide variety of diameters. The sensor unit 201 uses a tooth 205 on the mounting arrangement 204 to bite and lock onto the chamfer or undercut of the nut 105 or head 104. The banding 203 may be tightened to fit securely around the component of the fastener assembly 100 by means of a tightening screw 202. A grub screw 202 may be turned to ratchet banding 203 until tooth 205 locks under the chamfer of nut 105 or head 104. The locking mechanism of screw 202 provides secondary retention to prevent the sensor unit 201 from falling.

FIG. 24 depicts the sensor unit 201 of FIG. 23 mounted to a fastener assembly 100 and operably monitoring its tightness. The sensor unit 201 is securely attached to bolt 103 on its nut 105 and/or head 104 and used to detect small changes in the absolute or relative angular rotation or axial orientation of head 104 and/or nut 105. If two sensor units 201 are mounted on both the nut 105 and the head 104, comparison of their orientation or angular rotation can determine tiny changes in their relative angular rotation or axial orientation and may be indicative of nascent failure. The sensor unit 201 measurements axial orientation, angular rotation and processes measurements locally, determining the status of the fastener assembly 100 and communicating the status to a remote controller by means of radio frequency and/or optical communications interfaces integral to sensor unit 201, as will be discussed below. The sensor unit 201 may comprise an optical flow sensor 16 mounted on nut 105 that periodically images the thread on bolt 103 for movement.

Figure 25A:
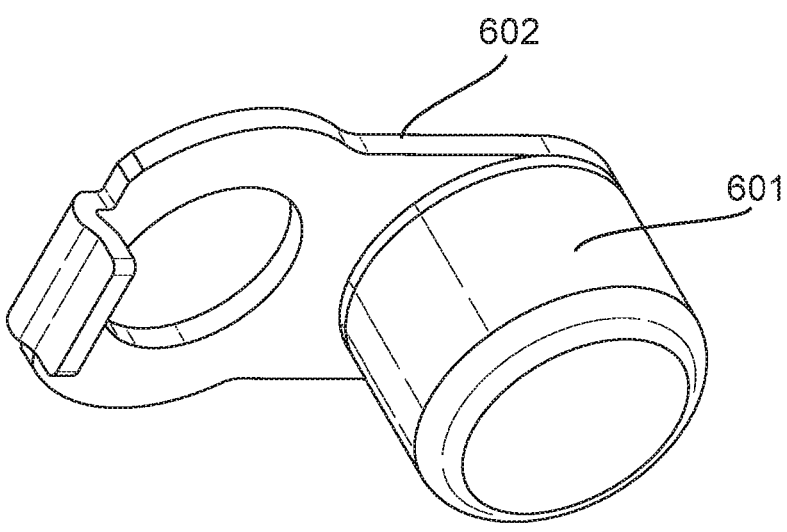
FIGS. 25(*a*) and 25(*b*) shows an alternative mounting for sensor units of the type shown in FIGS. 21 and 22.
Figure 25B:
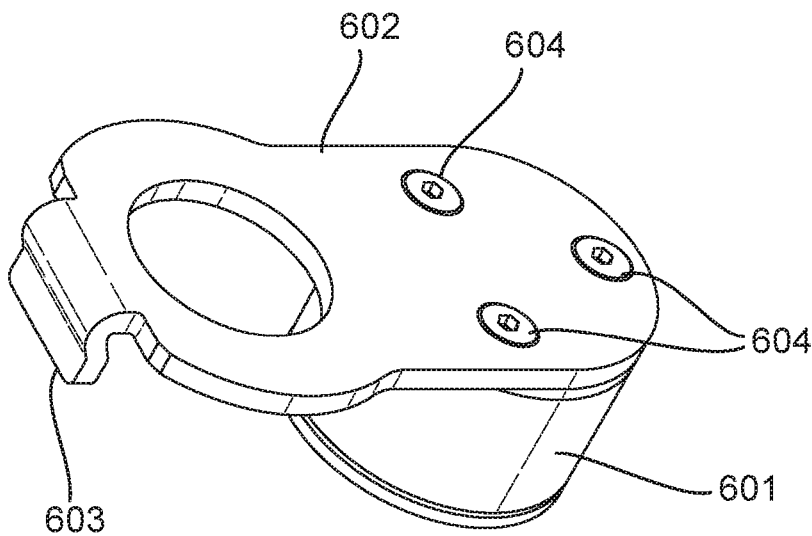
Figure 26A:
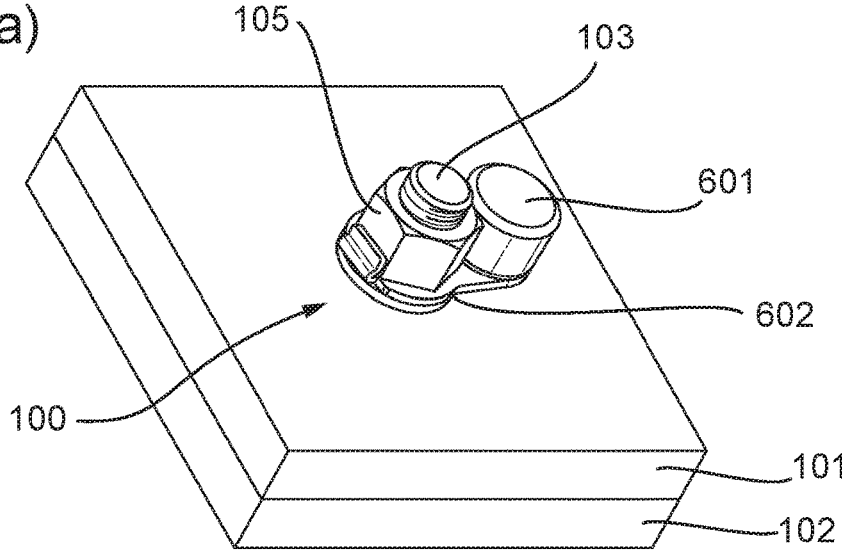
FIGS. 26(*a*) to 26(*c*) show mountings of the type shown in FIG. 25 used to attach a sensor unit adjacent to a fastener assembly.
Figure 26B:
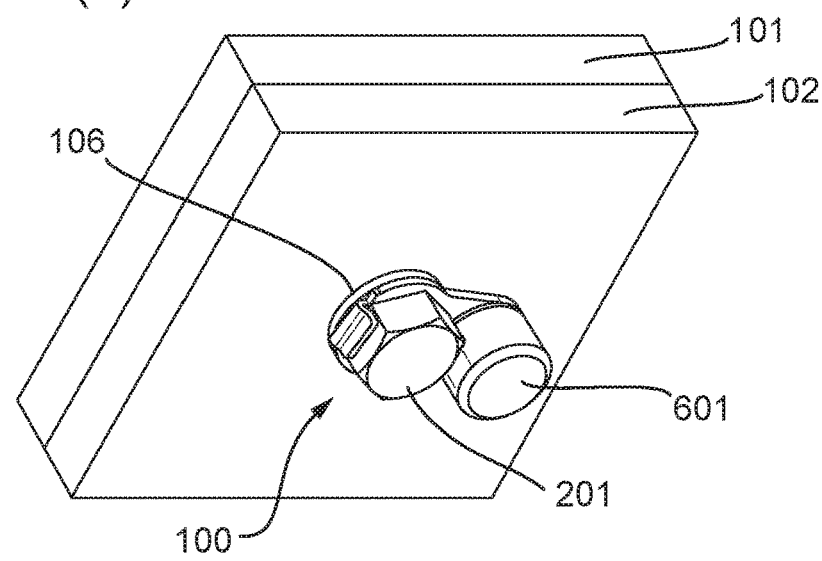
Figure 26C:
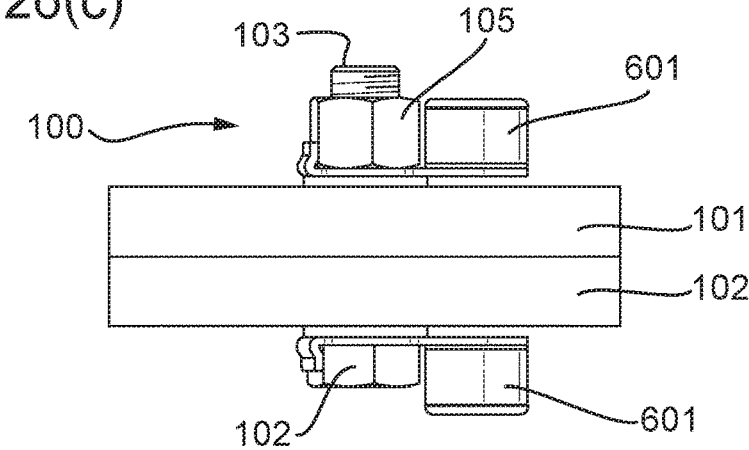

FIG. 25 depicts a further embodiment of the sensor unit 601. In this embodiment, the sensor unit 601 fits under an existing bolt head 104 or nut 105. The sensor unit 601 can be the standard device of any of FIGS. 8 to 20 with a simple metallic plate 602 to suit the hex size of the head 104 and or the nut 105. The sensor unit 601 is retained on the plate 602 with screws 604. The nut 105 and/or bolt 103 need to be removed in order to fit plate 602, which is disadvantageous for retrofitting but may be advantageous for new installations and may not be ideal when painting is considered. FIG. 26 depicts the sensor unit 601 mounted on a fastener assembly 100 including under head 104 and another sensor unit 601 under nut 105. Sensor unit 601 incorporates sensor technologies for measuring the angular rotation or axial orientation of head 104 or nut 105 and determines and wirelessly communicates the status of fastener assembly 100 based on detecting tiny changes in the absolute inclination, optical flow, vibration, offset, tilt, angular rotation or axial orientation of head 104 or nut 105. Sensor units 601 mounted on the nut 105 and head 104 of the same fastener assembly 100 may compare the orientations of head 104 and nut 105 for relative changes in angular orientation that are indicative of loosening or loss of torque.

Figure 27:
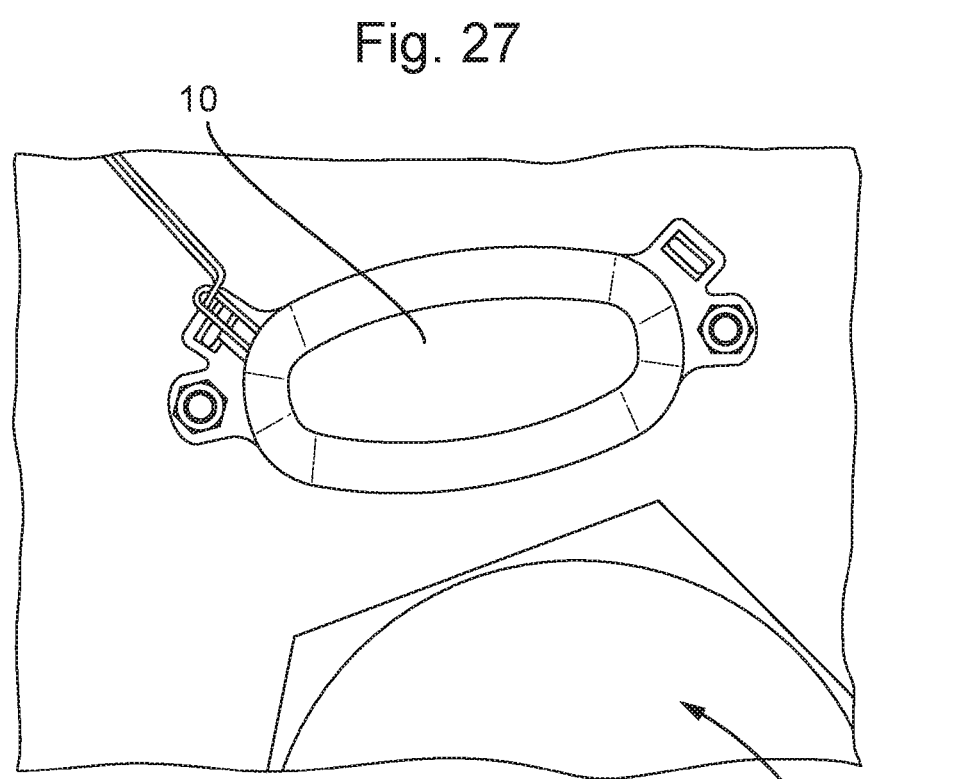
FIG. 27 shows a sensor unit mounted on a joint or surface adjacent to a fastener assembly to measure the clearance of a surface of a component of the fastener assembly (e.g. bolt hex-head) and to determine if the fastener assembly has moved with respect to the sensor unit.
Figure 28:
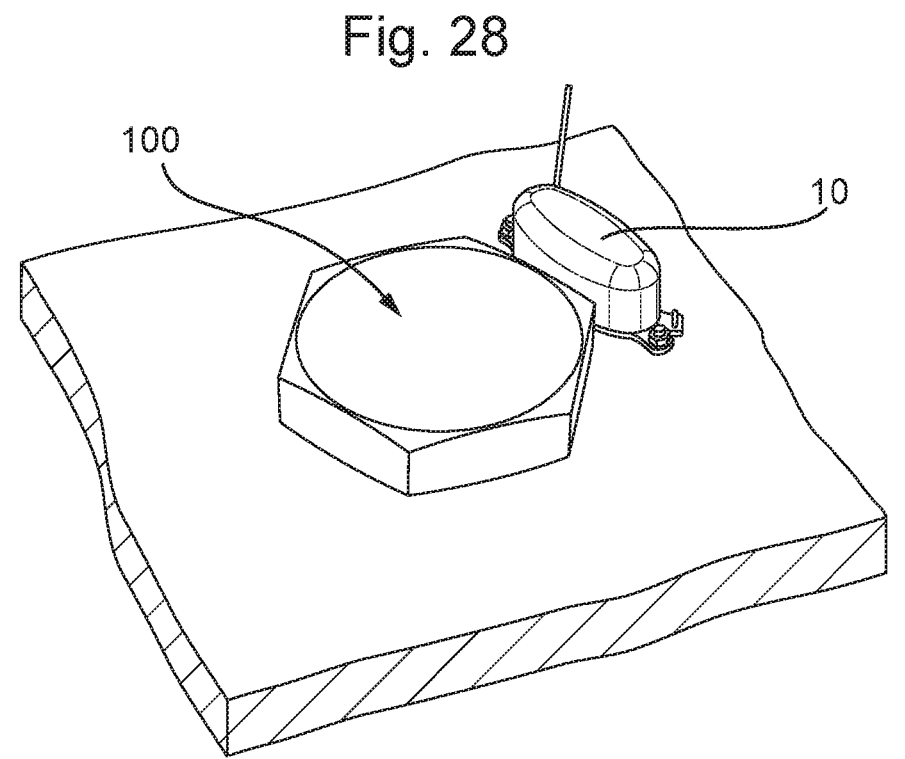
FIG. 28 is an alternative view of the sensor unit of FIG. 27.

In an alternative embodiment shown in FIGS. 27 and 28, the sensor unit 10 is mounted adjacent a fastener assembly 100 to detect rotation of a component, or of all, of the fastener assembly 100. A proximity sensor incorporated into the sensor unit 10 of the invention may be utilised to detect movement of the fastener assembly 100. For example, the sensor may be an inductive, or eddy current, sensor that detects changes in the proximity of the fastener assembly 100, for example movement of the bolt hex head 104 with respect to the sensor incorporated into the sensor unit 10 mounted adjacent the fastener assembly 100 and which is mounted on a surface that is fixed such as the joint, or part of the joint, that is fastened by the fastener assembly 100. In this manner the inductive, or eddy current sensor, measures the distance between the sensor unit 10 and the face of the hex head 104 and detects any change in this distance due to movement or rotation of the fastener assembly 100, or some component of the fastener assembly 100 such as the bolt head 104. Changes in the clearance between the proximity sensor, which may be an optical (e.g. optical flow), magnetic or electromagnetic sensor, are used to determine if the fastener assembly 100 has moved and a threshold may be set above which a message is relayed to a central display, computer or controller.

The sensor unit 10 further comprises a sensor, that is an optical flow sensor 16 or an inductive sensor, configured to sense movement of the fastener assembly 100. For example, in an embodiment the sensor is configured to sense angular rotation or axial movement of the fastener assembly 100. The sensor unit 10 incorporates sensors to measure and determine angular rotation, axial orientation, of a fastener assembly 100. The sensor unit 10 measures rotation of the main body of the fastener with respect to the nut 105, and of the fastener assembly 100 with respect to the fixed joint that it secures.

In particular, the sensors of the sensor units 10 shown in FIGS. 8, 9, 11, 12, 13, 21, 22, 27, 28, and 29 are configured to sense angular rotation or axial movement of the fastener assembly 100 with respect to an object which the fastener assembly 100 fastens. Rotation of the fastener assembly 100 with respect to the structure that it is mounted through may be an indication of a loss of tension, for example if the nut 105 is seized due to corrosion or degradation, due to movement of the structure, thermal expansion, stretching of a bolt 103 or gradually thinning of a structure.

Similarly, to make a measurement of angle, and determine a change in the absolute angular rotation of a nut 105, head 104 or other component of a fastener assembly 100 the sensor unit 10 may rely on the method described in WO2018087511 to compensate for the motion of a fastener attached to a moving frame of reference such as a ship, vehicle, offshore drilling rig or railway carriage. In this way, the sensor unit 10 may take a measurement of a change in angular rotation of a nut 105 or head 104 or other component of a fastener assembly 100 and determine the absolute change in angle with respect to a moving structure or frame of reference such as the derrick on a mobile offshore drilling unit (MODU).

The sensor of the sensor unit 10 may comprise an optical flow sensor 16. In some embodiments, the fastener assembly 100 may include an engagement portion, for example a bolt head 104, washer, or nut 105, which engages an object which the fastener assembly 100 fastens. The mounting of the sensor unit 10 may be arranged to rigidly attach the sensor unit 10 to the engagement portion, and the optical flow sensor 16 may be configured to sense angular rotation of the engagement portion with respect to the object.

In general, optical flow sensors 16 are more reliable in detecting angular rotation of the fastener assembly 100, or a part thereof. Rotation causes a more substantial change in the surface features in the field of view of the optical flow sensor 16. Axial movement is still detectable using an optical flow sensor 16, and may be more reliably detected when the sensor unit 10 is mounted adjacent to the fastener assembly so that the axial movement of the fastener assembly 100 occurs in the plane of view of the optical flow sensor 16 (for example where the mounting of the sensor unit 10 is of the type shown in FIGS. 23 to 25). When the mounting is of the type shown in FIGS. 14 to 20 (i.e. arranged to mount the sensor unit 10 to the engagement portion), axial movement of the fastener assembly 100 will be perpendicular to the plane of view of the optical flow sensor 16, and therefore only visible as a slight magnification or demagnification of the image.

FIGS. 8 to 11, and 18 to 20 show embodiments of the sensor unit 10 comprising an optical flow sensor 16. The sensor unit 10 may utilise optical flow technology to detect angular rotation of a bolt 103, fastener assembly 100 or nut 105 with respect to a fixed surface such as between a nut 105 and a bolt 103 or threaded screw, or bolt head 104 with respect to the surface it is fastened onto. An optical flow sensor 16 is a vision sensor capable of measuring optical flow or visual motion and outputting a measurement based on optical flow. An optical flow sensor 16 may be utilised to detect and measure changes in angular position or rotation of a shaft, thread. The optical flow sensor 16 could measure movement of discontinuities or roughness on the shaft, or movement in the surroundings of the optical flow sensor 16 such as prominent features such as nearby lights, or changes in contrast or brightness due to a change in orientation. Images would be taken periodically by a CCD or some other imaging device to determine by how much the screw thread or surface had moved relative to the fastener nut 105 or head 104. The optical flow sensor 16 could either be mounted on a stationary surface with a view of a moving surface or the other way around. When the surface moved under the optical flow sensor 16 the amount of movement could be measured by matching the images obtained from the optical flow sensor 16. Optical flow technology is widely used in optical mice with personal computers and is beginning to be used in drones and other autonomous flight machines because of widespread availability of generic, cheap, low-power consumption optical flow technology components and devices.

Figure 8:
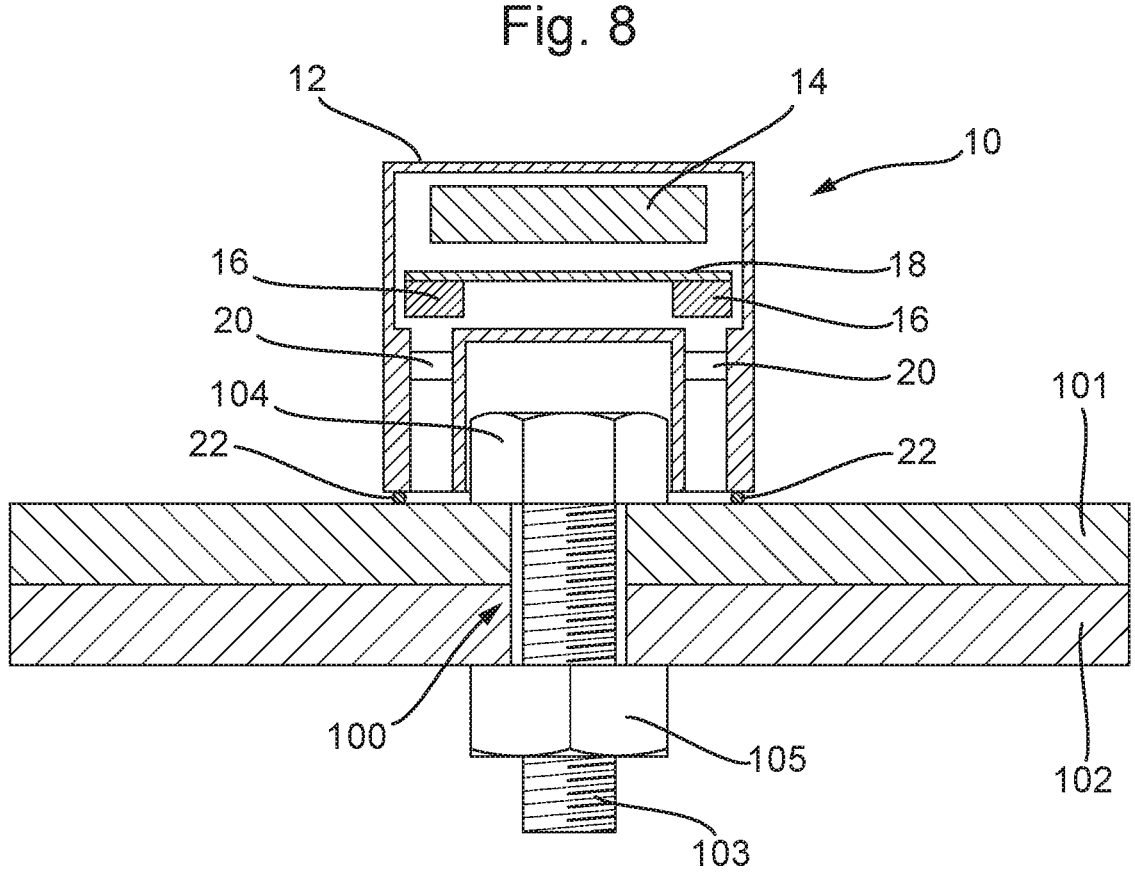
FIG. 8 is a schematic of a sensor unit using an optical flow sensor and mounted to a bolt of the fastener assembly to sense rotation of the fastener assembly relative to the object which the fastener assembly fastens.
Figure 9:
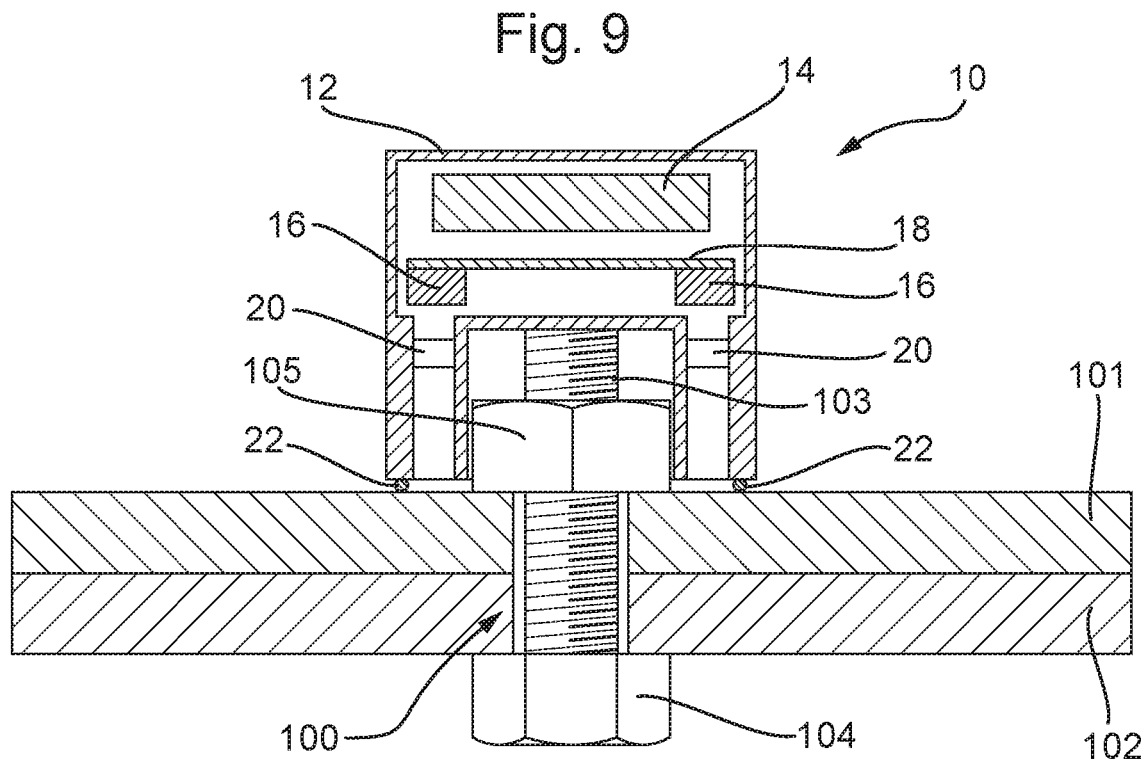
FIG. 9 is a schematic of a sensor unit using an optical flow sensor and mounted to a nut of the fastener assembly to sense rotation of the fastener assembly relative to the object which the fastener assembly fastens.
Figure 10:
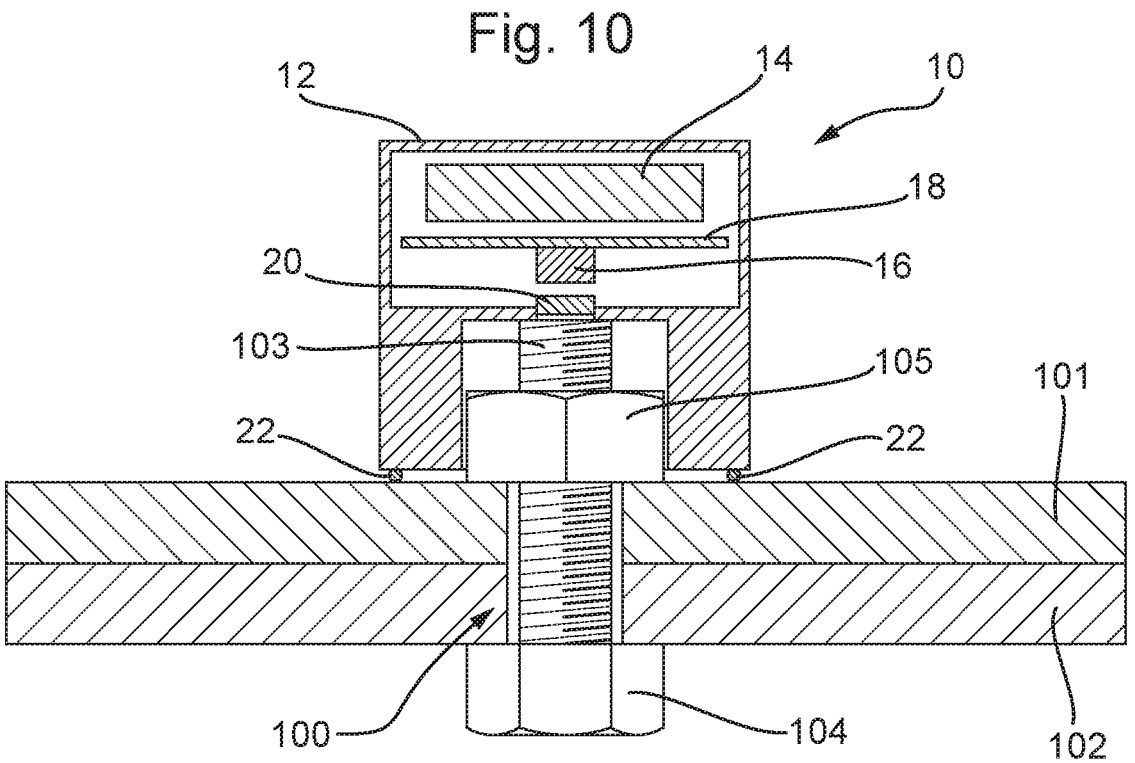
FIG. 10 is a schematic of a sensor unit using an optical flow sensor and mounted to a nut of the fastener assembly to sense rotation of one part of the fastener assembly relative to another part of the fastener assembly.
Figure 11:
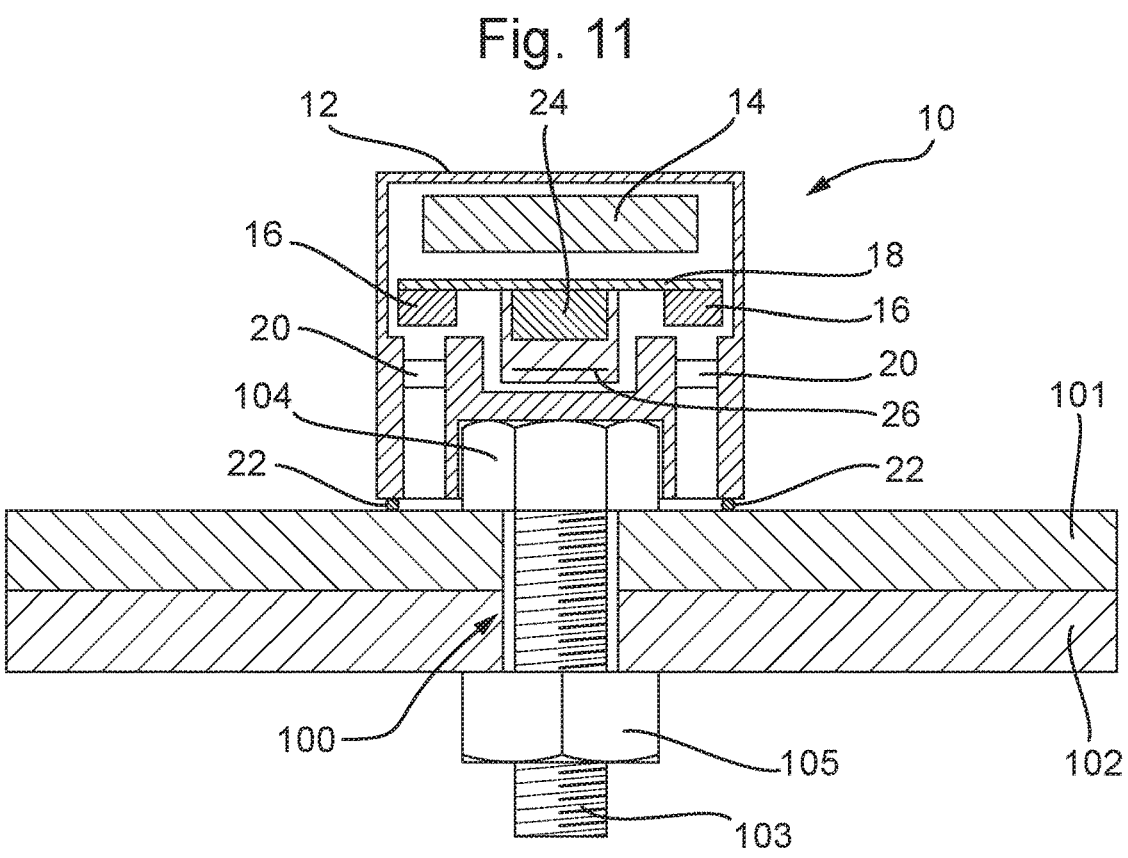
FIG. 11 is a schematic of a sensor unit of the type shown in FIG. 8 and further including an eddy current sensor.
Figure 12:
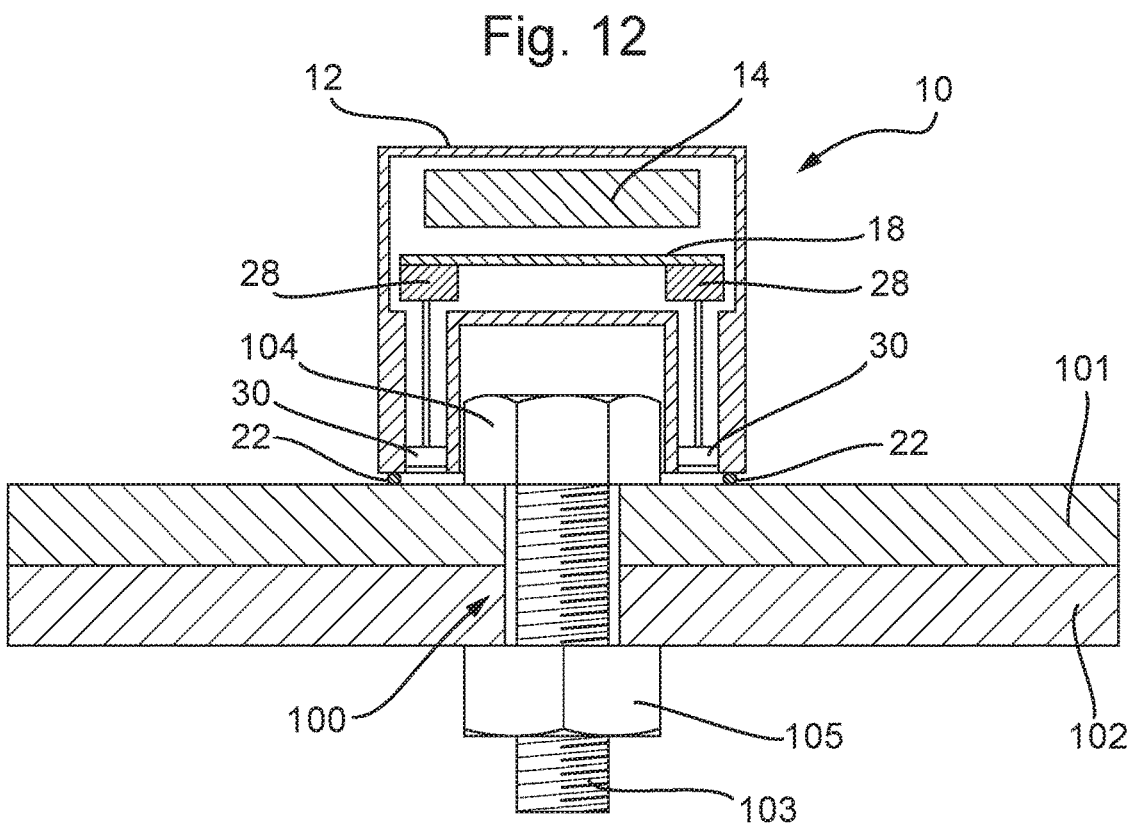
FIG. 12 is a schematic of a sensor unit using an inductive sensor and mounted to a bolt of the fastener assembly to sense rotation of the fastener assembly relative to the object which the fastener assembly fastens.
Figure 14A:
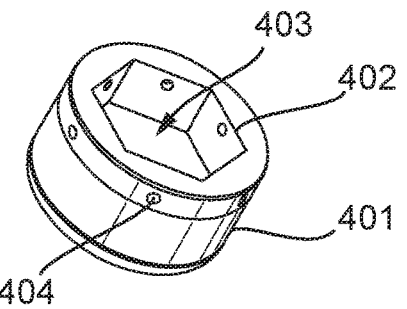
FIGS. 14(*a*) to 14(*h*) show views of a sensor unit and arrangements for mounting the sensor unit to an object.
Figure 14B:
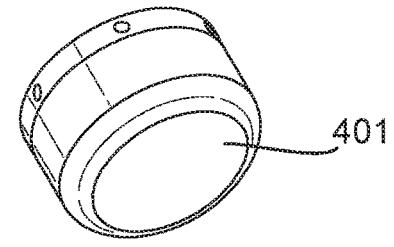
Figure 14C:
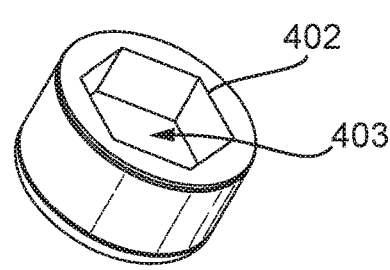
Figure 14D:
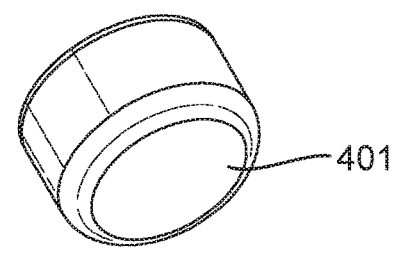
Figure 14E:
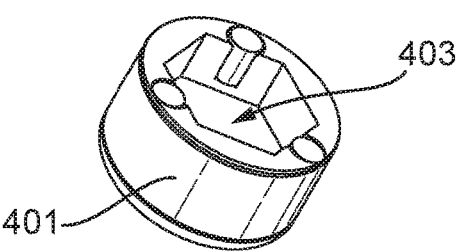
Figure 14F:
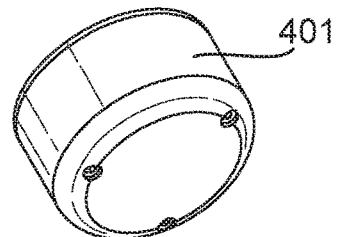
Figure 14G:
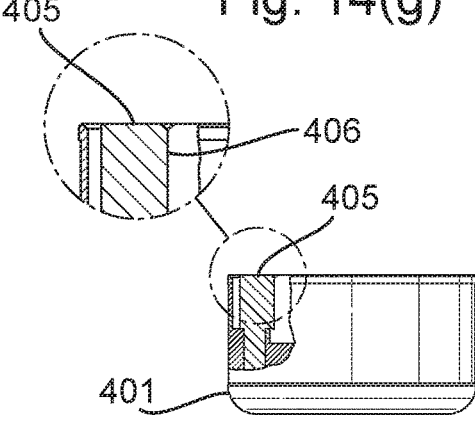
Figure 14H:
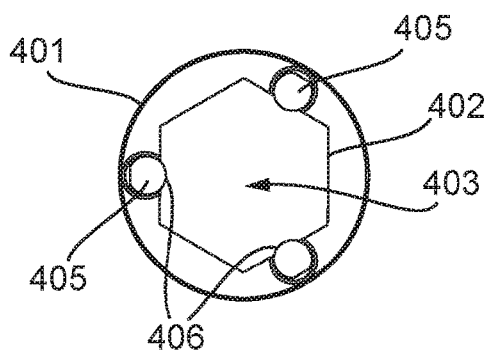

In the embodiments shown in FIGS. 8, 9, and 11, the optical flow sensor 16 or device detects relative motion between the part of the fastener assembly 100 onto which it is attached (e.g. the head 104 in FIG. 8 and the nut 105 in FIG. 9) and some fixed surface such as a screw thread or fixed surface of a rigid structure around the fastener assembly 100. Sequences of images are captured by a CCD imaging device or some optical detection device and compared to measure relative movement.

In the embodiments of FIGS. 8 to 11, the sensor unit 10 includes a lens 20 that focusses the image of the surface that the optical flow sensor 16 is observing. The O-ring 22 at the bottom of the sensor unit 10 can protect the lens 20 and other internal components of the sensor unit 10. Alternatively, the sensor unit 10 may be sealed and provided with one or more transparent windows to allow the optical flow sensor 16 to image the surface.

The optical flow sensor 16 is connected to the circuit board 18 for receiving power and transferring data from the images. The circuit board 18 may comprise a processor for processing the images from the optical flow sensor 16 to detect loosening of the fastener assembly 100 and output a signal representing the status of the fastener assembly 100. Alternatively, the optical flow sensor 16 may be an integrated package which includes the processor. In the case of FIGS. 8, 9, and 11, the sensor unit 10 comprises two optical flow sensors 16 and corresponding lenses 20. Using multiple optical flow sensors 16 and combining their output can improve the reliability and accuracy of the output signal from the processor. For example, more than two optical flow sensors 16 may be used, such as three, four, or more. However, this is not essential, and a single optical flow sensor 16 may be used.

The optical flow sensor 16 may be mounted on the nut 105, head 104 or some fixed or moving component of the fastener assembly 100 and used to measure changes in angular rotation and/or axial orientation of a component of a fastener assembly 100.

The optical flow sensor 16 may be an application specific device that incorporates MEMS accelerometers, gyroscopes, Hall effect sensors and processing on the same die. The optical flow sensor 16 may incorporate a light source, such as a LED or solid-state laser, to periodically capture sequential images of a proximate surface. The imaged surface in close proximity may be a thread, or washer, or fixed surface, or pin, or a rigid structure, and these multiple sequential images may be processed to determine movement of optical flow sensor 16 with respect to the proximate surface. The sensor unit 10, incorporating an optical flow sensor 16, may determine and measure relative movement of a component of a fastener assembly 100 in this manner. The period of image capture may be infrequent, up to weeks or even months apart, since changes in the tension of the fastener assembly 100 are likely to be very gradual. Alternatively, the image capture frequency may be adjusted or intermittently triggered dynamically based on shock, vibration, motion, changes in magnetic flux, conductivity, pH, or changes in orientation detected by accelerometers, gyroscopes or inertial measurement units (IMUs).

The optical flow sensor 16 of the sensor unit 10 may be used to detect changes in fastener tension and confirm tension meets a specified threshold. Likewise, the optical flow sensor 16 may be utilised to detect changes in stress, strain or distortion. The optical sensor may be utilised to monitor the fastener assembly 100 for discolouration and surface quality as an indication of corrosion and degradation.

The sensor of the sensor unit 10 may comprise an inductive sensor. In some embodiments, the fastener assembly 100 includes an engagement portion, for example a bolt head 104, washer, or nut 105, which engages an object which the fastener assembly 100 fastens. The mounting of the sensor unit 10 may be arranged to rigidly attach or mount the sensor unit 10 to the engagement portion. In such embodiments, the inductive sensor may be configured to sense axial movement of the engagement portion with respect to the object. In other embodiments, the mounting may be arranged to mount the sensor unit 10 adjacent to the fastener assembly 100, and the inductive sensor may be configured to sense angular rotation of the engagement portion with respect to the object.

In general, inductive sensors are more reliable in detecting changes in the distance between the inductive sensor and another body. Therefore, when the mounting is of the type shown in FIGS. 14 to 20 (i.e. arranged to mount the sensor unit 10 to the engagement portion), axial movement of the fastener assembly 100 will cause a change in the distance between the sensor unit 10 and the object which the fastener assembly 100 fastens. This will be more reliably detected by the inductive sensor. However, angular rotation of the fastener assembly 100 will not cause a change in distance, and so is less reliably detected. Detection of angular rotation is still possible, for example through generation of eddy currents in the object. When the mounting is of the type shown in FIGS. 23 to 25 (i.e. arranged to mount the sensor unit 10 adjacent to the fastener assembly 100) an inductive sensor may detect angular rotation of the fastener assembly 100 reliably as the distance to a face of the bolt head 104 or nut 105 changes. However, axial movement will be less reliably detected as very little change in distance to the sensor unit 10 occurs.

FIGS. 12, 13, 21, 22, and 27 to 30 show embodiments of the sensor unit 10 comprising an inductive sensor. The inductive sensor comprises inductive sensor electronics 28 and a coil 30. In some embodiments, the inductive sensor electronics 28 may be integrated into the circuit board 18, and not provided separately. The coil 30 is placed at the surface of the sensor unit 10 that is closest in use to the surface of the object which the fastener assembly 100 fastens. This ensures the change in signal due to any movement of the fastener assembly 100 is greatest.

The inductive sensor may be a proximity sensor incorporated into the sensor unit 10 and utilised to detect movement of the fastener assembly 100. For example, the sensor of the sensor unit 10 may be an inductive, or eddy current, sensor that detects changes in the proximity of the fastener assembly 100, for example movement of the bolt hex head 104 with respect to the sensor incorporated into a sensor unit 10 mounting adjacent the fastener assembly 100 and which is mounted on a surface that is fixed such as the joint, or part of the joint, that is fastened by the fastener assembly 100. In this manner the inductive sensor, or eddy current sensor, measures the distance between the sensor and the face of the hex head 104 and detects any change in this distance due to movement or rotation of the fastener assembly 100, or some component of the fastener assembly 100 such as the bolt head 104. Changes in the clearance between the inductive sensor, which may be a magnetic or electromagnetic sensor, are used to determine if the fastener assembly 100 has moved and a threshold may be set above which a message is relayed to a central display, computer or controller. In a further embodiment the inductive sensor, or eddy current sensor, incorporates a coil 30, or coils, to detect the distance, or clearance, between the bolt hex head 104 or nut 105 (or some component of a fastener assembly 100) and the inductive sensor coil 30, or coils. Rotation of a component of the fastener assembly 100 such as the bolt head 104 or nut 105 can be detected as a change in the clearance, or distance, of a proximate surface of the fastener assembly 100 from the inductive sensor coil 30, or coils. In the examples shown in FIGS. 12 and 13, the sensor unit 10 comprises two inductive sensors, each comprising inductive sensor electronics 28 and a corresponding coil 30. Using inductive sensors and combining their output can improve the reliability and accuracy of the output signal from the processor. For example, more than two inductive sensors may be used, such as three, four, or more. However, this is not essential, and a single inductive sensor may be used.

The advantage of exploiting inductive, or eddy current, sensor technology to detect and measure changes in axial rotation or position of a fastener assembly 100, or components of a fastener assembly 100, is that it is unaffected by the presence of contamination such as metal particulates, corrosion, dirt, grease or lubricants, or paint. Inductive sensor technology utilised in the sensor unit 10 may be of the kind disclosed in the assignee's patents EP2338032, EP2713137, GB2506424, GB2506912, EP2574735, GB2495388, U.S. Pat. No. 9,030,212, EP2524061, SG10201501801X, U.S. Pat. No. 9,587,657 and wireless device disclosed WO2019102222 which are hereby incorporated by reference. In this manner a stable, robust measurement solution for monitoring the integrity of fastener assemblies 100 and joints may be provided that can be rapidly retro-fitted in service and that operates across a broad of conditions and unaffected by contamination, grease or dirt.

Inductive sensors may also use a target/sensor detection scheme. For example, the sensor unit 10 may comprise a target, for example a magnetic target, provided on the object which the fastener assembly 100 fastens. In this case, the inductive sensor may detect movement of the target relative to the inductive sensor in order to detect movement of the fastener assembly 100 relative to the object. In some embodiments, the sensor of the sensor unit 10 is configured to sense angular rotation or axial movement of parts of the fastener assembly 100 with respect to each other. For example, the sensor may detect movement of the nut 105 relative to the bolt 103. This may be achieved using optical flow sensors 16 or inductive sensors.

FIG. 10 shows an embodiment using an optical flow sensor 16 to detect movement of parts of the fastener assembly 100 with respect to each other, in this case the nut 105 relative to the bolt 103. The sensor unit 10 is mounted on the nut 105, and the optical flow sensor 16 is placed to detect rotation of the bolt end. Alternatively, the sensor unit 10 may be mounted to the bolt 103 and the optical flow sensor 16 placed to detect movement of the nut 105.

Figure 29:
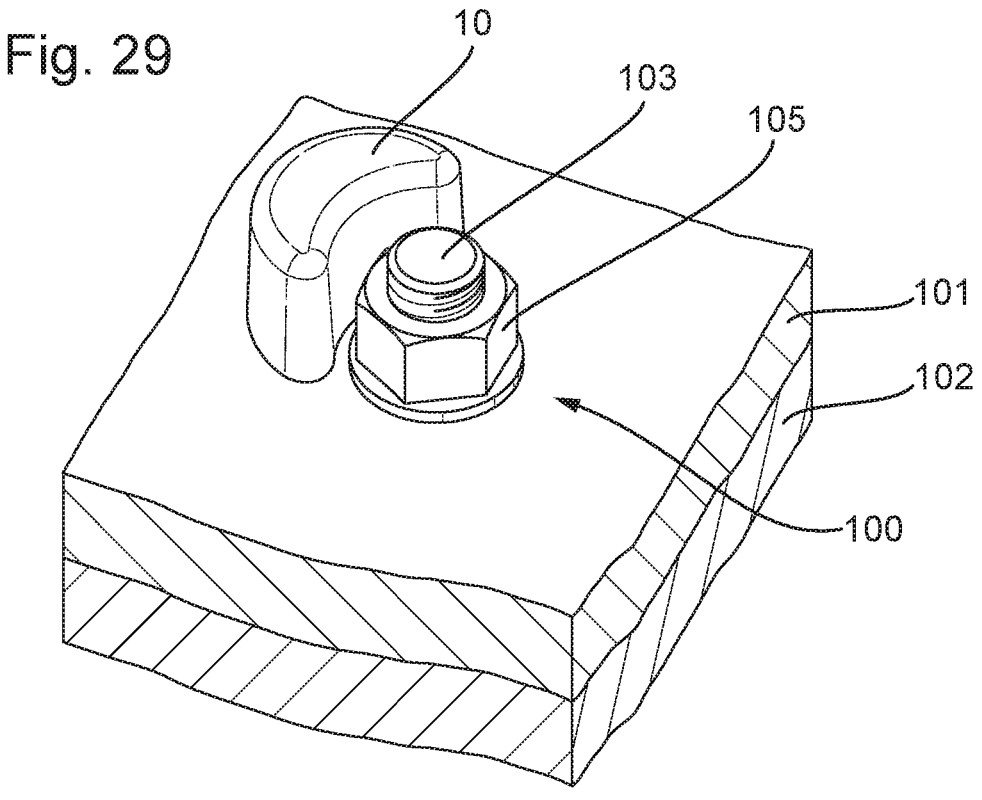
FIG. 29 shows an alternative sensor unit mounted adjacent to a fastener assembly for detecting movement of the fastener assembly.
Figure 30:
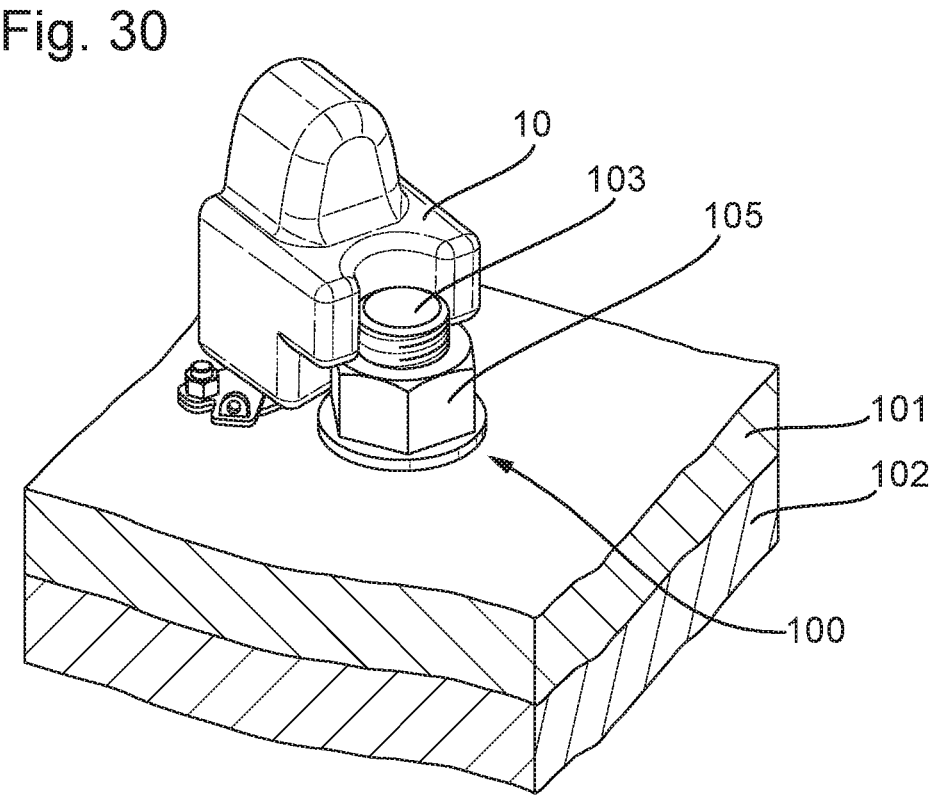
FIG. 30 shows a further alternative sensor unit mounted adjacent to a fastener assembly for detecting relative movement of parts of the fastener assembly.
Figure 31:
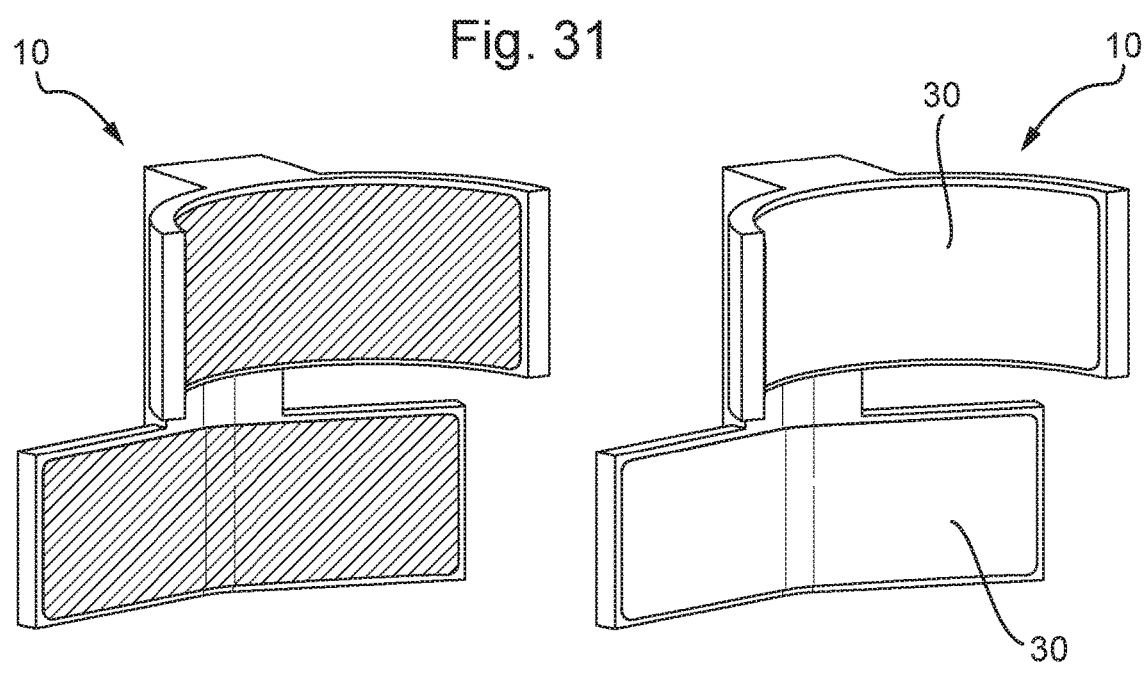
FIG. 31 shows coil designs for the sensor unit of FIG. 30.

Inductive sensors may also detect movement of parts of the fastener assembly 100 with respect to each other. Plural coils 30 may be used to detect clearance at various locations on a fastener assembly 100. Examples of this type of arrangement are shown in FIGS. 30 and 31. Dual coils 30 may be used to perform differential measurements of changes in clearance such that the overall measurement is not susceptible to environmental conditions such as changes in temperature. Similarly, dual coils 30 may be incorporated in the sensor unit 10 and used to detect direction of rotation of a bolt head 104 or nut 105, or some component of a fastener assembly 100. Multiple coils 30 may be used to measure height, and position, of the fastener assembly 100 above another component of the fastener assembly 100, or a joint, or rigid structure. For example, coils 30 may be utilised to detect the height of the stud above the nut 105 and small changes in this exposed height will be indicative of loss of tension or stretching or compression of the bolt as shown in FIGS. 29 to 31. Coil or coils 30 may be incorporated into the sensor unit 10 to detect axial rotation, direction of rotation and changes in height of a component of a fastener assembly 100 such as the bolt head 104 or stud which is indicative of loss of tension, or stretching, of the fastener assembly 100. In this manner plural coils 30 may be incorporated into the sensor unit 10 to detect and measure changes in characteristics of a fastener assembly 100 such as axial rotation, tension, direction of rotation, bending, cracking, rigidity or torsion. Plural coils 30 may be operated in a differential manner to ensure measurement stability across a range of environmental conditions.

Inductive sensors may also use a target/sensor detection scheme. For example, the sensor unit 10 may be mounted on a first part of the fastener assembly, for example the bolt 103, and further comprise a target, for example a magnetic target, provided on a second part of the fastener assembly 100, for example the nut 105. In this case, the inductive sensor may detect movement of the target relative to the inductive sensor in order to detect movement of the first part of the fastener assembly 100 relative to the second part of the fastener assembly 100.

On a rotating machine or wheel, two sensor unit 10 mounted on the head 104 and nut 105 of the fastener assembly 100 may be installed to detect changes in their relative, rather than absolute, orientation or angular rotation thereby detecting nascent failure or loss of torque. Arrangements of this type are shown in FIGS. 24, and 26. The sensor unit 10 may compare the relative orientation of the head 104 and its corresponding nut 105 for changes in the relative orientation of the head 104 and nut 105 in order to detect nascent movement and loosening of a fastener assembly 100.

Figure 32:
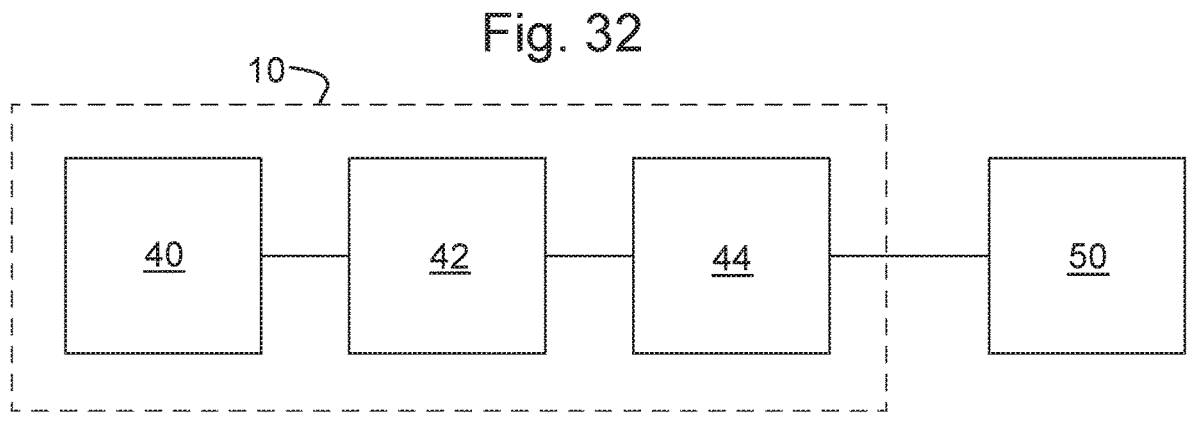
FIG. 32 shows a schematic of a sensor unit.

A schematic of the sensor unit 10 is shown in FIG. 32. The sensor unit 10 includes the sensor 40. A processor and memory are provided to record measurements and provide an electronic log for validation and inspection of riser condition. The device incorporates processor and memory to execute software and analysis measurements and determine status. In some embodiments, the sensor unit 10 further comprises a processor 42 arranged to process the output of the sensor 40 to detect loosening of the fastener assembly 100 and to output a signal representing the status of the fastener assembly 100. The processor 42 may be included in the circuit board 18, or provided separately.

Tiny changes in the angular rotation of a fastener assembly 100 or a component of a fastener assembly 100 may be detected and using to trigger warnings of nascent changes in integrity of a fastener assembly 100. A small change or rotation of the fastener assembly 100, of even one tenth degree of angular rotation, may be an indicator of nascent failure, reduced torque, cracking, corrosion or loss of rigidity. A threshold may be implemented to determine status, for example if the axial rotation exceeds a certain number of degrees or radians. Likewise, the sensor unit 10 may incorporate additional sensors to measure tension, torque, hardness, conductivity, corrosion, magnetic flux, shear, strain, load cells, compression, tilt, angular orientation, distortion and vibration.

The riser 1 may additionally include one or more position sensors for detecting the position of the riser 1. Such a position sensor may be of any suitable type and may preferably be a low power sensor such as a MEMS sensor, which may be for example configured as an inclinometer or accelerometer. Examples of alternative types of position sensor that could be used include: tilt ball sensor; infrared; laser; acoustic; capacitive; magnetic or Hall Effect sensors. These may be integrated into the sensor unit 10, and the processing of these signals combined with the processing of signals from the optical flow sensor or inductive sensor. Position sensors for the sensor unit 10 may include location sensors such as GPS modules, inertial sensors such as accelerometers and gyroscopes.

The sensor units 10 may be located at bolts on both ends of the riser section 5. In this instance these sensor units may monitor corresponding ends used to secure the same length of riser section 5. In this case the sensor units 10 may be paired, or their outputs combined, such that the sensor unit 10 detects an anomaly if these corresponding ends (or flanges 3a) do not operate simultaneously. For example, if a riser section 5 has been placed in the riser stack, both of the corresponding sensor units 10 on the upper and lower ends of the riser section 5 should be in proximate location, and their orientation can be used to give the position of the riser section 5 in the riser 1. The output of the 'paired' sensor units 10 on the upper and lower ends of the riser section 5 can be combined and compared to detect an anomaly and flag a warning to an operator via a display.

In some embodiments, the sensor unit 10 further comprises a processor 42 arranged to process the output of the sensor 40, and an eddy current sensor configured to monitor the condition of the fastener assembly 100, the processor 42 further being arranged to process the output of the eddy current sensor. The sensor unit 10 may comprise an eddy current sensor configured to measure electro-magnetic properties of a fastener assembly 100. An example of such an embodiment is shown in FIG. 11. The sensor unit 10 incorporates a coil 26, or coils, that inductively senses the metallic fastener assembly 100 and measures its conductivity, magnetic flux and the presence or absence of corrosion in the fastener assembly 100. The sensor unit 10 may further comprise a magnet 24. Coils may be exploited to couple magnetic flux through the fastener assembly 100 to measure a trend and detect nascent corrosion, cracking or deformation. Eddy current sensing may be exploited to detect local cracking. This coil 26, or coils, may be designed such that it has a second function and may be used for near field communications or RF communications with an adjacent device.

The sensor unit 10 may incorporate other condition sensors to measure shock, vibration and compression on the fastener assembly 100. The condition sensors may rely on piezoelectric material mounted between a bolt head 104 and a surface or between the nut 105 and a surface to measure compression. Changes in the compression of the material will indicate a change in the tension of the fastener assembly 100 and predict nascent failure. Similarly, measurements of shock and vibration may be recorded and correlated or compared with other measurements such as axial orientation and angular rotation to predict nascent failure or operation of the fastener assembly 100 out of specification. Optionally, the sensor unit 10 may further comprise a condition sensor configured to sense the compression on a component of a fastener assembly 100. The sensor unit 10 may incorporate an ultrasonic or acoustic transducer to measure the speed of sound, and any reflections, along the primary axis of the fastener assembly 100. In this manner the ultrasonic or acoustic sensor technology could be exploited to detect reflection and time of flight of a pulse from a transducer to the opposing face or end of the bolt 103 or fastener assembly 100, and measure any small changes in the length, or cross-sectional area, of the bolt 103 that correlate with changes in tension, compression and/or corrosion or cracking. The ultrasonic transducer may be incorporated into the sensor unit 10 and mounted on a component of the fastener assembly 100 by means of a cap, on the bolt head 104 or the hex-head, on the stud or inside a nut 105 or washer.

To measure riser assembly 2 condition, measurements of bolt condition may be made. Eddy current or inductive sensors may be used to measure cracking, corrosion, surface quality, pitting, degradation and condition based on magnetic susceptibility and conductivity across multiple frequencies. Measurements of frequency shift, and amplitude as well as 'Q' factor can be used to track changes in materials condition. At low frequencies skin depth is such that it may penetrate from one surface through the wall to another surface. Measurements of surface condition and scale can be taken in a similar fashion.

The sensor unit 10 may be retrofitted to a bolt head 104 or nut 105, or both, and programmed to monitor the axial orientation of the head 104 or bolt 103, or both, and detect changes and alert a user wirelessly via a controller and/or user interface or display, to changes in the absolute or relative axial orientation or angular orientation of a fastener assembly 100, a bolt head 104, a nut 105, or component of a fastener assembly 100. The sensor unit 10 may form part of a network that is interfaced with a OEM control system. For example, as shown in FIG. 32, the sensor unit 10 may communicate with a monitoring system 50. Accordingly, changes in the status, functionality, behaviour, condition or safety of critical fasteners may be monitored from a controller in the monitoring system 50 and used as feedback to control, slow-down or interlock equipment used during operations to prevent dropped objects or other incidents arising from failure of a fastener assembly 100 such as a loose bolt or nut in a critical location. Likewise, the sensor unit 10 could be used to monitor the status of critical bolts or screws, and to interface with an OEM control system, such as the monitoring system 50, and communicate the status of fastener assemblies 100. Changes in the status of fastener assemblies 100, for example beyond a threshold, may be used to interlock machinery to ensure that equipment is not operated until the fastener assembly 100 is securely tightened or replaced. Modulating a signal in accordance with the orientation of a fastener assembly 100 allows for a wireless sensor unit 10 to be provided that is suitable for use in remote locations without the need to make an electrical connection, as the output of the sensor unit 10 may be monitored.

Multiple sensor units 10 installed on fastener assemblies 100 together may form a sensor array. The measurements from this array of sensor units 10 may be combined to predict failure, condition and behaviour of a structure. Data from this array of sensor units 10 together may be analysed and displayed as a three-dimensional model of a structure. The display may include torsion, vibration and orientation of fastener assemblies 100. Over time, measurements may be logged and used to plot fatigue, and to predict failure, mechanical damage or concentrations of stress. These logs may be correlated or compared with other activities of a rig or structure, to log behaviour of critical structures, joints, gantries, cranes, welds, bolts and fastener assemblies 100 during drilling, jarring, completion, vibration, high winds, rough seas, storms, swell, heave, mooring, 'stick slip', stuck drill bits, the use of explosives during mining or drilling, hydraulic fracturing or 'rocking' of a well. The log may be analysed, combining various measurements and parameters, to predict or anticipate failure, condition or service life of a structure or fastener assembly 100. These logs from arrays of sensor units 10 mounted on fastener assemblies 100 could be used to predict and/or detect damage, buckling, distortion, cracking, degradation or fatigue on derricks, draw works, cranes, doors, davits, bulkheads or other critical pieces of equipment around a rig or vessel. The sensor units 10 may be deployed permanently or temporarily (e.g. during rig-up, lifting or decommissioning). When correlated with other sources of data such as weather, navigation, riser tension, mooring line tension, drilling depth, pressure, 'kicks', temperature, wind speed etc. the output of the model could include time to failure or the location of fatigued components, fastener assemblies 100 and structures. An array of sensor units 10 could together form a model for comparison with Finite Element Analysis models of a structure, and form nodes for modal analysis of a structure under certain operational and environmental conditions. Likewise, the data from arrays of sensor units 10 may be logged and analysed to generate a dynamic model for a structure, machine, flange or critical joint. These arrays, and analysis and stress testing of the resulting models, could be used for the purposes of securing class approval with notified bodies such as American Bureau of Shipping (ABS), DNV-GL and Lloyds Register.

The sensor unit 10 may incorporate GPS devices or other electronic positioning technology to confirm and track condition of fastener assemblies 10 and connections of the riser in the derrick and on the deck, or in storage on land. The sensor unit 10 may be mounted on critical components of the riser package such as choke, lower marine riser package and kill lines.

Data or meta-data generated by the sensor units 10 monitoring risers throughout the deployment will include riser bolt characteristics such as sensor ID, riser ID, date, time, number of pressure cycles, count of riser movements, count of riser immersion, sensor signal level, sensor battery power, self-diagnostic information, shock, vibration, position, angle, speed, acceleration, temperature, pressure, conductivity, salinity, magnetism, corrosion, scale, surface defects, surface hardness and surface quality etc. These data may be logged and analysed to identify risers that are not performing to specification or may be in need of maintenance or replacement. The data recorded may be used to compare riser package condition with requirements of industry standards, e.g. in accordance with API standards 53, 7L, spec 15F, RP160, spec 16R, RP17G and DNV-RP-F206 and other standards for maintenance, monitoring and inspection of marine riser packages. The history logged by the sensor unit 10 may be analysed for its history and condition over a five-year interval in accordance with SPS and ABS requirements for periodic inspection. These data may be analysed for condition-based monitoring the risers to minimise downtime and, by planning maintenance based on likelihood of riser failure of inspection, maximise availability and operational efficiency. In addition, the data logs and meta-data may be presented to manufacturers, suppliers, customers, third-party auditors or regulators to validate equipment warranty, indicate safety performance and to demonstrate compliance with best practice and compliance with regulations. Finally, the sensor unit 10 may provide data for analysis in models or simulations of riser condition as part of its maintenance cycle or special periodic service. Indeed, this longitudinal collection of measurements of pipe condition may be used as an alternative to periodic NDT and inspection, saving on manual processes and auditing costs.

The sensor unit 10 may be used to monitor equipment in addition to the riser 1, including drill pipe, casing, production tubing, cutting tools, bottom-hole assemblies, production risers, flexible riser and flowlines. The data from the sensor unit 10 may be used to provide integrity along the riser, and to monitor their position, location, orientation and condition to demonstrate the riser is secure.

The sensor unit 10 may be encapsulated in a suitable material that is resistant to drilling fluids, brine, cement, sunlight, UV radiation, grease, pipe dope, iron filings and other debris. Advantageously, the material may be PEEK plastic, which is chemically inert. In particular, grades of PEEK that include carbon such as TECAPEEK black, and TECAPEEK CF30 black (manufactured by Ensinger, UK) and that use Victrex PEEK 450G as the base component. These grades of PEEK may be welded to seal the sensor unit 10 and provide IP67 or IP68 water-proofing as well as certification to IECEx and ATEX standards for use in flammable atmospheres.

The sensor unit 10 and its mounting (securing member) may be fabricated from a tough, durable material to withstand shock, vibration, temperature extremes, ice, direct sunlight, UV degradation and washing with a high-pressure jet of water at over 200 Psi. Suitable materials used for manufacturing of the enclosure for sensor unit 10 and mounting include PEEK, carbon fibre, fibreglass, PEAK, PEEK reinforced with carbon fibre and other engineering thermoplastics and composites or elastomers. The material to manufacture sensor unit 10 and mounting may be a suitable composite, such as carbon fibre or fibre glass, or a plastic, for example Polyether ether ketone (PEEK), or an elastomer, for example a rubber. The sensor unit 10 and mounting may also incorporate non-metallic lining materials to provide additional friction, integrity and sealing to keep out oils and debris. These may be incorporate 'o' rings that provide compression to accommodate riser tolerances for the dimensions of the riser arm which can be broad. The non-metallic materials used in the sensor unit 10 may be of a type known to be suitable for use as a lining of a in oil and gas applications. Suitable materials for the non-metallic lining in the sensor unit 10 can include, without limitation: polyisoprene, styrene butadiene rubber, ethylene propylene diene monomer rubber, polychloroprene rubber, chlorosulphonated polyethylene rubber, 'Viton' or nitrile butadiene rubber. The material may also be a mixture of these and/or other materials.

The sensing unit 10 may further comprise a power source, such as a battery 14. The power source may be any type of standalone power source known in the art that is capable of providing power to the sensor unit 10 including the sensor and other components such as the processor 42 and wireless communication unit 44 (discussed further below). For example, the power source may comprise a battery 14, solar cell or capacitor. The power source may optionally comprise an energy harvesting device that is configured to harvest energy from environment of the riser assembly 2. For example, the power source may be configured to harvest energy from the motion, shock or vibration of the riser section 5. The power source may be provided integral with the sensor unit 10, or removably attached to the sensor unit 10. A sensor unit 10 that is easily maintained for long periods of deployment may thus be provided. Integrated processing circuits may be implemented with the optical flow sensor 16 to minimise power consumption.

The power source such as a battery 14 with long life characteristics may be used to power the sensor unit 10. The battery 14 is ideally compact in format and can fit within the sensor unit 10 mounted to the riser arm by the mounting. To avoid frequent replacement of the sensor unit 10, the battery 14 ideally will have sufficient capacity to power the sensor unit 10 for tens of thousands of riser cycles over several years (e.g. five years between SPS). Optionally the battery 14 utilised may be a Lithium Thionyl Chloride battery that has been selected and configured to last the lifetime of the equipment. The battery 14 may be supplemented with a supercapacitor for storing and releasing charge, e.g. for broadcast of information wirelessly by radio or by means of modulated light signal.

The sensor unit 10 is capable of being run for extended periods of time from a remote power source such as a battery 14. Energy scavenging may be exploited to generate power and to supplement power from a battery 14 or supercapacitor. Energy may be harvested from mechanical noise, vibration, shock, solar energy, pneumatic lines and pressurised air, hydraulic lines or thermal sources and thermal gradients (e.g. using a Peltier and heat sink).

As the sensor unit 10 is mounted on the riser, the sensor may be of a type that is relatively simple and of low power compared to a sensor mounted on the riser that indirectly senses the riser fastener assembly 100. Thus, an inexpensive sensor unit 10 that is capable of being run from a standalone power source may be provided.

In an embodiment where the sensor unit 10 comprises a processor 42, the sensor unit 10 may further comprise a wireless communication unit 44 arranged to communicate the signal from the processor 42. The wireless communication unit 44 may be a radio communication interface arranged to communicate using radio frequency electromagnetic (EM) waves. The wireless communication unit 44 may be used to wirelessly communicate the signal to a monitoring system 50 under the control of the processor 42.

In some applications, there may be no wireless communication unit 44, in which case the signal from the processor 42 may be logged and communicated at a later time, for example over a wired connection. For example, the riser section 5 may comprise wiring used to transmit the signals from the processor 42.

The wireless communication unit 44 may communicate to a monitoring system 50 which may have a similar configuration to the monitoring system for latches of a fingerboard latch system as disclosed in WO-2018/007804. The monitoring system 50 provides an indication of the status of the fastener assemblies 100 to a user, for example on a display or audibly. The monitoring system 50 may provide a warning when the status of any fastener assembly 100 is loosened or otherwise in a dangerous state.

Ideally, the sensor unit 10 communicates wirelessly using a wireless communication unit 44 with a receiver, such as the monitoring system 50, to control, collect, analyse, trend and display data from multiple sensor unit 10 mounted, attached or clamped onto critical fastener assemblies 100 around a structure or rigid member. The sensor unit 10 may communicate wirelessly using the network protocol described in WO2019020972. The sensor unit 10 may communicate wirelessly by optical, radio-frequency or other electro-magnetic means. The sensor unit 10 may incorporate a LED as a visual indictor, or by optically by means of LiFi, or an RF communications interface relying on proprietary or commercially-available protocols such as Bluetooth, Bluetooth low energy (BLE), LORA, 4G, 5G, ZigBee or WIFI. Optical communication may be detected by a camera or photodiode to detect modulated light. LIDAR, time of flight cameras, time of flight radio may be used to locate the sensor units 10 and detect coarse changes in their orientation or behaviour. Alternatively, a wireless communication unit 44 is provided relying on radio communications.

To communicate wirelessly, the sensor unit 10 may utilise radio-frequencies. Optionally, a frequency may be selected that has a wavelength that does not suffer from attenuation or reflections from pipes and tubulars stacked or stored on the deck or in the yard. To minimise reflections and loss of signal, a radio frequency may be selected that has a wavelength that is less than the minimum spacing between tubulars when stacked in storage. This minimum spacing will be determined by the minimum pitch between the riser sections 5. An embodiment for a sensor unit 10 with a mounting advantageously utilises a wireless communications frequency that has a wavelength that is less than the minimum spacing between risers. The frequency selected should not interfere with marine communications equipment, Optionally, the frequency selected may be between 1 kHz and 3 GHz. The communications frequency may be long-wave, or at a frequency suitable for transmission over long distances when location of a section of riser, and remotely determining its condition, is desirable. Optionally, underwater communications may be by means of ultrasonic transducers. The signal may be relayed from a sensor unit 10 to the surface, or via adjacent units.

A network of wireless sensor units 10 may be provided to communicate among the sensor units 10, and with each other, to relay signals for processing and display of riser condition and location to an operator, e.g. via the monitoring system 50. These sensor units 10 communicate with gateways to maximise reception and signal coverage. Optionally, these gateways may be located at four locations, forward, aft, port and starboard on the platform or rig. A further transceiver is mounted at, or near, the drillers' cabin and/or the Local Equipment Room (LER). The transceiver wireless gateway at the drillers' cabin and/or LER is the central transceiver which receives signals from the sensor units 10 and the network gateway transceivers around the rig.

Additionally, the sensor unit 10 use for near field communications (NFC). The NFC functionality may be used to switch on, or off, a completely sealed sensor unit 10 without any external contact or switch. NFC may be used via the sensor 40 to put the sensor unit 10 in a dormant or low power state prior to shipping, and to 'wake' up the sensor unit 10 via NFC on arrival or when installed and put into operation. The one or more sensor coil 30 or coils may incorporate coils for sensing tubular and NFC devices, or both. The coils 30 may be mounted concentrically or adjacent to each other on a printed circuit board or flexible printed circuit board. Similarly, the NFC coil may be used to update the sensor unit 10 firmware and software, or to interrogate the sensor unit 10 during debugging. In these ways power may be saved during manufacture, assembly, transportation and storage, ready for reactivating on installation. Similarly, communications can be by means of RFID, modulation of light, barcode, QR code, retroreflection, wireless, radio, Bluetooth, power over ethernet, etc.

The mounting may comprise one or more light sources. Thus, the light sources are directed upwards. As riser assemblies are typically mounted vertically, this means they are visible from above. It also keeps them cleaner, reducing the risk of obscuring the output light. The light sources may emit light in any suitable wavelength band, for example infrared, visible or ultraviolet. Similarly, the light sources may be substituted or complemented with a radio-frequency wireless communications unit 44.

The output of the one or more light sources is modulated in accordance with the position of the riser sensed by the sensor unit 10. The modulation may be implemented in any number of ways. In the simplest case, the light sources may be in an on or off state corresponding to two different conditions, positions and locations of the riser, e.g. angular orientation, tension, pressure, temperature, tally etc. Alternatively, the modulation may convey more information. For example, the number of lit light sources may identify the position of the riser section 5, or bolt thickness, or water salinity, conductivity or load. Alternatively, the modulation may be a change in the colour or flashing rate of lit light sources to identify the position of the riser section 5. In another embodiment, a lit light source may identify that the riser section 5 is in a fault condition, and an unlit light source may indicate that the riser section 5 is functioning normally. Thus, a more reliable riser light source may be provided that clearly indicates when the riser is safely secured or in normal condition.

Modulating a light source in accordance with the output of the sensor unit 10 allows for a wireless sensor unit 10 to be provided that is suitable for use in remote locations without the need to make an electrical connection, as the output of the light source may be monitored and/or relayed sub-sea or on the surface.

Modulating a light source in accordance with the position of the riser allows for a wireless sensor unit 10 to be provided that is suitable for use in remote (submarine) locations without the need to make an electrical connection. The light sources provide instant indication of tubular integrity, as well as broadband data, which may be monitored by a person or remotely monitored via a detector system such as photodetectors or cameras mounted on each sensor unit 10 to relay messages to the surface, or to cameras at the surface while riser is stored on deck, for example. Image processing may be used to provide automated monitoring.

In some situations, the sensor unit 10 according to any embodiment described herein may be provided or manufactured in combination with a fastener assembly 100. This may be particularly advantageous in situations such as where the sensor unit 10 is integrated into the fastener assembly 100, e.g. into a cavity in the bolt 103, head 104, or nut 105.

Figure 33:
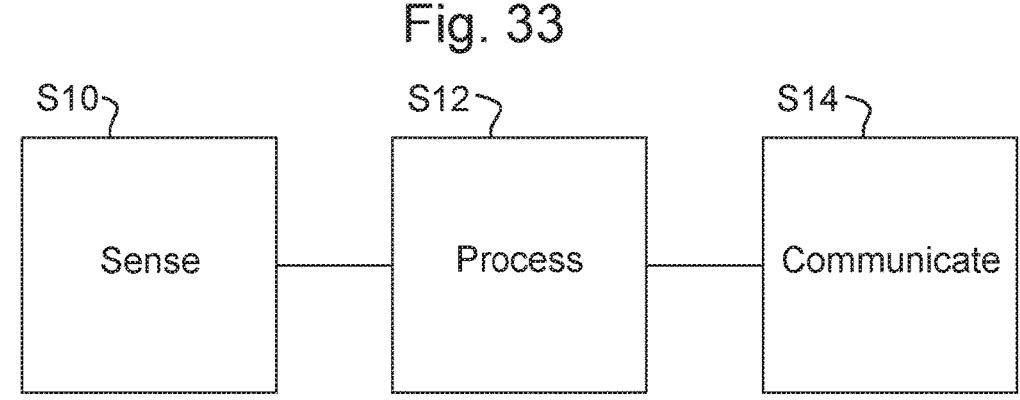
FIG. 33 is a flowchart of a method of sensing the status of a fastener assembly.

FIG. 33 shows a flowchart of an embodiment of a method of sensing the status of a fastener assembly 100, in which the sensor unit 10 described above may be utilised. The method comprises a step S10 of sensing movement of the fastener assembly 100 by a sensor, that is an optical flow sensor 16 or an inductive sensor rigidly attached to, or adjacent to, the fastener assembly 100. The method further comprises a step S12 of processing the output of the sensor to detect loosening of the fastener assembly 100 and outputting a signal representing the status of the fastener assembly 100. Finally, the method of FIG. 33 comprises a step S14 of wirelessly communicating the signal. For example, the signal may be communicated to a monitoring system 50 such as shown in FIG. 32.

CLAUSES

According to a further aspect of the present invention, there is provided a sensor unit for a fastener assembly, the sensor unit comprising: a sensor configured to sense the axial orientation and/or angular rotation of a fastener; and a processor, the output of the sensor being processed in accordance with the orientation of the fastener sensed by the sensor.

The following clauses define further aspects of the present invention:

Clause 1. A wireless sensor unit for an assembly, the sensor unit comprising:

a mounting for rigidly attaching the sensor to an assembly, a sensor configured to sense the axial orientation, indexing and/or angular rotation of an assembly; and a processor, the output of the sensor being processed in accordance with the angular and/or axial orientation of the assembly sensed by the sensor, measuring a change in the absolute or relative axial orientation and/or angular rotation of an assembly, determining a status for the assembly, and a communications circuit for transmitting a signal in accordance with the orientation of an assembly.

Clause 2. A monitoring unit for a fastener assembly comprising a monitoring unit supported on the fastener, the sensor unit comprising:

a sensor configured to sense the axial orientation of at least one component of the fastener assembly; and a processor, and a memory device, a cavity within which the monitoring unit can be mounted.

Clause 3. A sensor unit according to clause 1 or 2, being mountable inside the body of the bolt and secured by the rotatable securing member.

Clause4. A sensor unit according to clause 1 or 2, being mountable inside the body of the fastener assembly and secured by a resilient member, epoxy or adhesive, Clause 5. A fastener assembly for a fastener assembly assembly, the fastener assembly having a sensor unit according to clause 1 or 2 integrated therein, where the fastener assembly is manufactured from non-metallic material Clause 6. A fastener assembly for a fastener assembly assembly, the fastener assembly having a sensor unit according to clause 1 or 2 mounted therein, where the fastener assembly is manufactured from plastic, composite materials, laminate or carbon fibre, Clause 7. A fastener assembly for a fastener assembly assembly, the fastener assembly having a sensor unit according to any one of the preceding clauses integrated therein, where the sensor unit incorporates non-metallic lining materials, Clause 8. A sensor unit according to any one of the preceding clauses, where the sensor unit communicates wirelessly Clause 9. A sensor unit according to clause 8, where the sensor unit communicates wirelessly utilising a wavelength that is less than the minimum spacing between fastener assemblies mounted in storage or stacked, Clause 10. A sensor unit according to any one of the preceding clauses, where the sensor unit utilises a Lithium Thionyl Chloride battery to provide power over prolonged periods of operation, Clause 11. A sensor unit according to any one of the preceding clauses that communicates wireless via a network of transceivers, wherein the transceivers are mountable to existing equipment around the derrick and communicate wirelessly with the sensor unit and each other to relay data from the sensor unit to a central processor and display Clause 12. The sensor unit according to any one of the preceding clauses where the output of more than one sensor unit may be combined to compare the fastener assembly positions of more than one fastener assembly and detect anomalies in fastener assembly position.

Clause 13. The sensor unit/according to any one of the preceding clauses where the output of a sensor unit may include metadata which is logged electronically including date and time.

Clause 14. A sensor unit according to any one of the preceding clauses where the data logged can include sensor identity, fastener assembly section identity, number of pressure cycles, count of immersion, count of surface storage, temperature, time of fastener assembly immersion, time of fastener assembly surface, speed, acceleration, angle, orientation, water salinity, conductivity, magnetic susceptibility, GPS data, battery charge, signal level.

Clause 15. The sensor unit according to any one of the preceding clauses where the sensor incorporates GPS technology to provide location of the sensor unit on the fastener assembly assembly, Clause 16. The sensor unit according to any one of the preceding clauses where the sensor unit may be removed from the cavity in the fastener assembly arm and replaced.

Clause 16. A sensor unit according to any one of the preceding clauses, being mountable on the body of the fastener assembly and secured by the bracket and incorporating eddy current sensors for monitoring fastener assembly condition.

The invention claimed is:

1. A sensor unit for a fastener assembly, the sensor unit comprising:

a mounting arranged to rigidly attach the sensor unit to, or adjacent to, a fastener assembly;

an optical flow sensor configured to sense a characteristic of the fastener assembly; and a processor arranged to process the output of the optical flow sensor to detect the characteristic of the fastener assembly and to output a signal representing the status of the fastener assembly;

wherein:

the fastener assembly comprises a plurality of parts that include a bolt or screw;

a longitudinal axis can be defined for the bolt, or screw, such that a rotation about the longitudinal axis of the bolt, or screw, either acts to screw or acts to unscrew the bolt, or screw;

the optical flow sensor, that is positioned such that its plane of view is parallel to the longitudinal axis, is configured to directly sense relative movement along the longitudinal axis of parts of the fastener assembly towards or apart from each other in a direction that is parallel to the plane of view of the optical flow sensor; and the characteristic includes at least one of loosening, tension, compression, stress, strain, and/or distortion of the fastener assembly.

2. The sensor unit according to claim 1, wherein the sensor unit further comprises a wireless communication unit arranged to communicate the signal.

3. The sensor unit according to claim 1, wherein the optical flow sensor is configured to sense movement along the longitudinal axis of the fastener assembly with respect to an object which the fastener assembly fastens.

4. The sensor unit according to claim 1, wherein the mounting is arranged to rigidly attach the sensor unit to the fastener assembly and the sensor unit is mounted to the fastener assembly.

5. The sensor unit according to claim 1, wherein the mounting is arranged to rigidly attach the sensor unit to the fastener assembly and the fastener assembly includes an engagement portion which engages an object which the fastener assembly fastens, and the mounting is arranged to rigidly attach the sensor unit to the engagement portion of the fastener assembly.

6. The sensor unit according to claim 1, wherein the mounting is arranged to rigidly attach the sensor unit adjacent to the fastener assembly and the sensor unit is mounted adjacent to the fastener assembly.

7. The sensor unit according to claim 1, further comprising an eddy current sensor configured to monitor the condition of the fastener assembly, the processor further being arranged to process the output of the eddy current sensor.

8. The combination of sensor unit according to claim 1 with a fastener assembly.

9. The sensor unit according to claim 5, wherein the fastener assembly comprises the bolt having a head and a nut rotatably supported on the bolt, the engagement portion being the nut or the head of the bolt.

10. The sensor unit according to claim 9, wherein the mounting rigidly attaches the sensor unit as a cap over the nut or the head of the bolt.

11. The sensor unit according to claim 5, wherein the optical flow sensor is configured to sense movement along the longitudinal axis of the engagement portion with respect to another part of the fastener assembly.

12. The sensor unit according to claim 11, wherein the engagement portion is the nut and the other part of the fastener assembly is the bolt.

13. The sensor unit according to claim 12, wherein the other part of the fastener assembly is a thread of the bolt or an end of the bolt.

14. The sensor unit according to claim 1, wherein the mounting permits retrofitting of the sensor unit to a fastener assembly or integrates the sensor unit with the fastener assembly.

\* \* \* \* \*